(12) United States Patent
Giobbi

(10) Patent No.: US 10,698,989 B2
(45) Date of Patent: *Jun. 30, 2020

(54) BIOMETRIC PERSONAL DATA KEY (PDK) AUTHENTICATION

(71) Applicant: Proxense, LLC, Bend, OR (US)

(72) Inventor: John J. Giobbi, Bend, OR (US)

(73) Assignee: Proxense, LLC, Bend, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/049,060

(22) Filed: Feb. 20, 2016

(65) Prior Publication Data

US 2016/0171200 A1 Jun. 16, 2016

Related U.S. Application Data

(63) Continuation of application No. 14/521,982, filed on Oct. 23, 2014, now Pat. No. 9,298,905, which is a
(Continued)

(51) Int. Cl.
*G06F 21/00* (2013.01)
*G06F 21/32* (2013.01)
(Continued)

(52) U.S. Cl.
CPC .............. *G06F 21/32* (2013.01); *G05B 1/00* (2013.01); *G06F 21/35* (2013.01); *G07C 9/257* (2020.01); *H04L 9/321* (2013.01)

(58) Field of Classification Search
CPC combination set(s) only.
See application file for complete search history.

(56) References Cited

U.S. PATENT DOCUMENTS 3,739,329 A 6/1973 Lester
3,761,883 A 9/1973 Alvarez et al.
(Continued)

FOREIGN PATENT DOCUMENTS

JP  H10-49604   2/1998
WO  0062505 A1  10/2000
(Continued)

OTHER PUBLICATIONS

"Rajendran Jeyaprakash, Jin Lee, Subir Biswas, Jae Mook Kim, Secured Smart Card Using Palm Vein Biometric On-card-Process, Aug. 28-30, 2008, IEEE Xplore, INSPEC #10205191" (Year: 2008).*

(Continued)

*Primary Examiner* — Phy Anh T Vu
(74) *Attorney, Agent, or Firm* — Patent Law Works LLP

(57) ABSTRACT

Systems and methods verifying a user during authentication of an integrated device. In one embodiment, the system includes an integrated device and an authentication unit. The integrated device stores biometric data of a user and a plurality of codes and other data values comprising a device ID code uniquely identifying the integrated device and a secret decryption value in a tamper proof format, and when scan data is verified by comparing the scan data to the biometric data, wirelessly sends one or more codes and other data values including the device ID code. The authentication unit receives and sends the one or more codes and the other data values to an agent for authentication, and receives an access message from the agent indicating that the agent successfully authenticated the one or more codes and other data values and allows the user to access an application.

9 Claims, 6 Drawing Sheets

Related U.S. Application Data continuation of application No. 13/710,109, filed on Dec. 10, 2012, now Pat. No. 8,886,954, which is a continuation of application No. 11/314,199, filed on Dec. 20, 2005, now Pat. No. 8,352,730.

(60) Provisional application No. 60/652,765, filed on Feb. 14, 2005, provisional application No. 60/637,538, filed on Dec. 20, 2004.

(51) Int. Cl.
*G07C 9/25* (2020.01)
*G06F 21/35* (2013.01)
*G05B 1/00* (2006.01)
*H04L 9/32* (2006.01)

(56) References Cited

U.S. PATENT DOCUMENTS

| | | | |
|---|---|---|---|
| 4,430,705 A | 2/1984 | Cannavino et al. | |
| 4,661,821 A | 4/1987 | Smith | |
| 4,759,060 A | 7/1988 | Hayashi et al. | |
| 4,993,068 A | 2/1991 | Piosenka et al. | |
| 5,187,352 A | 2/1993 | Blair et al. | |
| 5,224,164 A | 6/1993 | Elsner | |
| 5,296,641 A | 3/1994 | Stelzel | |
| 5,307,349 A | 4/1994 | Shloss et al. | |
| 5,317,572 A | 5/1994 | Satoh | |
| 5,325,285 A | 6/1994 | Araki | |
| 5,392,287 A | 2/1995 | Tiedemann, Jr. et al. | |
| 5,392,433 A | 2/1995 | Hammersley et al. | |
| 5,410,588 A | 4/1995 | Ito | |
| 5,416,780 A | 5/1995 | Patel | |
| 5,422,632 A | 6/1995 | Bucholtz et al. | |
| 5,428,684 A | 6/1995 | Akiyama et al. | |
| 5,450,489 A | 9/1995 | Ostrover et al. | |
| 5,473,690 A | 12/1995 | Grimonprez et al. | |
| 5,481,265 A | 1/1996 | Russell | |
| 5,506,863 A | 4/1996 | Meidan et al. | |
| 5,517,502 A | 5/1996 | Bestler et al. | |
| 5,541,583 A | 7/1996 | Mandelbaum | |
| 5,563,947 A | 10/1996 | Kikinis | |
| 5,589,838 A | 12/1996 | McEwan | |
| 5,594,227 A | 1/1997 | Deo | |
| 5,598,474 A * | 1/1997 | Johnson | G06F 21/32 713/186 |
| 5,611,050 A | 3/1997 | Theimer et al. | |
| 5,619,251 A | 4/1997 | Kuroiwa et al. | |
| 5,623,552 A | 4/1997 | Lane | |
| 5,629,980 A | 5/1997 | Stefik et al. | |
| 5,644,354 A | 7/1997 | Thompson et al. | |
| 5,666,412 A | 9/1997 | Handelman et al. | |
| 5,689,529 A | 11/1997 | Johnson | |
| 5,692,049 A | 11/1997 | Johnson et al. | |
| 5,719,387 A | 2/1998 | Fujioka | |
| 5,729,237 A | 3/1998 | Webb | |
| 5,760,705 A | 6/1998 | Glessner et al. | |
| 5,760,744 A | 6/1998 | Sauer | |
| 5,773,954 A | 6/1998 | VanHorn | |
| 5,784,464 A | 7/1998 | Akiyama et al. | |
| 5,799,085 A | 8/1998 | Shona | |
| 5,825,876 A | 10/1998 | Peterson, Jr. | |
| 5,835,595 A | 11/1998 | Fraser et al. | |
| 5,838,306 A | 11/1998 | O'Connor et al. | |
| 5,854,891 A | 12/1998 | Postlewaite et al. | |
| 5,857,020 A | 1/1999 | Peterson, Jr. | |
| 5,886,634 A | 3/1999 | Muhme | |
| 5,892,825 A | 4/1999 | Mages et al. | |
| 5,892,900 A | 4/1999 | Ginter et al. | |
| 5,894,551 A | 4/1999 | Huggins et al. | |
| 5,898,880 A | 4/1999 | Ryu | |
| 5,910,776 A | 6/1999 | Black | |
| 5,917,913 A | 6/1999 | Wang | |
| 5,928,327 A | 7/1999 | Wang et al. | |
| 5,991,399 A | 11/1999 | Graunke et al. | |
| 5,991,749 A | 11/1999 | Morrill, Jr. | |
| 6,016,476 A | 1/2000 | Maes et al. | |
| 6,018,739 A | 1/2000 | McCoy | |
| 6,025,780 A | 2/2000 | Bowers | |
| 6,035,038 A | 3/2000 | Campinos et al. | |
| 6,035,329 A | 3/2000 | Mages et al. | |
| 6,038,334 A | 3/2000 | Hamid | |
| 6,040,786 A | 3/2000 | Fujioka | |
| 6,041,410 A * | 3/2000 | Hsu | G06K 9/00013 380/285 |
| 6,042,006 A | 3/2000 | Van Tilburg et al. | |
| 6,055,314 A | 4/2000 | Spies et al. | |
| 6,070,796 A | 6/2000 | Sirbu | |
| 6,088,730 A | 7/2000 | Kato et al. | |
| 6,104,290 A | 8/2000 | Naguleswaran | |
| 6,104,334 A | 8/2000 | Allport | |
| 6,110,041 A | 8/2000 | Walker et al. | |
| 6,121,544 A | 9/2000 | Petsinger | |
| 6,134,283 A | 10/2000 | Sands et al. | |
| 6,138,010 A | 10/2000 | Rabe et al. | |
| 6,148,142 A | 11/2000 | Anderson | |
| 6,148,210 A | 11/2000 | Elwin et al. | |
| 6,161,179 A | 12/2000 | Seidel | |
| 6,177,887 B1 | 1/2001 | Jerome | |
| 6,185,316 B1 | 2/2001 | Buffam | |
| 6,209,089 B1 | 3/2001 | Selitrennikoff et al. | |
| 6,219,109 B1 | 4/2001 | Raynesford et al. | |
| 6,219,439 B1 | 4/2001 | Burger | |
| 6,219,553 B1 | 4/2001 | Panasik | |
| 6,237,848 B1 | 5/2001 | Everett | |
| 6,240,076 B1 | 5/2001 | Kanerva et al. | |
| 6,247,130 B1 | 6/2001 | Fritsch | |
| 6,249,869 B1 | 6/2001 | Drupsteen et al. | |
| 6,256,737 B1 | 7/2001 | Bianco et al. | |
| 6,266,415 B1 | 7/2001 | Campinos et al. | |
| 6,270,011 B1 * | 8/2001 | Gottfried | G06F 21/32 235/379 |
| 6,279,111 B1 | 8/2001 | Jensenworth et al. | |
| 6,279,146 B1 | 8/2001 | Evans et al. | |
| 6,295,057 B1 | 9/2001 | Rosin et al. | |
| 6,325,285 B1 | 12/2001 | Baratelli | |
| 6,336,121 B1 | 1/2002 | Lyson et al. | |
| 6,336,142 B1 | 1/2002 | Kato et al. | |
| 6,343,280 B2 | 1/2002 | Clark | |
| 6,345,347 B1 | 2/2002 | Biran | |
| 6,363,485 B1 | 3/2002 | Adams et al. | |
| 6,367,019 B1 | 4/2002 | Ansell et al. | |
| 6,369,693 B1 | 4/2002 | Gibson | |
| 6,370,376 B1 | 4/2002 | Sheath | |
| 6,381,747 B1 | 4/2002 | Wonfor et al. | |
| 6,385,596 B1 | 5/2002 | Wiser et al. | |
| 6,392,664 B1 | 5/2002 | White et al. | |
| 6,397,387 B1 | 5/2002 | Rosin et al. | |
| 6,401,059 B1 | 6/2002 | Shen et al. | |
| 6,411,307 B1 | 6/2002 | Rosin et al. | |
| 6,424,249 B1 | 7/2002 | Houvener | |
| 6,424,715 B1 | 7/2002 | Saito | |
| 6,425,084 B1 | 7/2002 | Rallis et al. | |
| 6,434,403 B1 | 8/2002 | Ausems et al. | |
| 6,434,535 B1 | 8/2002 | Kupka et al. | |
| 6,446,130 B1 | 9/2002 | Grapes | |
| 6,463,534 B1 | 10/2002 | Geiger et al. | |
| 6,480,101 B1 | 11/2002 | Kelly et al. | |
| 6,480,188 B1 | 11/2002 | Horsley | |
| 6,484,946 B2 | 11/2002 | Matsumoto et al. | |
| 6,487,663 B1 | 11/2002 | Jaisimha et al. | |
| 6,490,443 B1 | 12/2002 | Freeny, Jr. | |
| 6,510,350 B1 | 1/2003 | Steen, III et al. | |
| 6,522,253 B1 | 2/2003 | Saltus | |
| 6,523,113 B1 | 2/2003 | Wehrenberg | |
| 6,529,949 B1 | 3/2003 | Getsin et al. | |
| 6,546,418 B2 | 4/2003 | Schena et al. | |
| 6,550,011 B1 | 4/2003 | Sims, III | |
| 6,563,465 B2 | 5/2003 | Frecska | |
| 6,563,805 B1 | 5/2003 | Ma et al. | |
| 6,564,380 B1 | 5/2003 | Murphy | |
| 6,577,238 B1 | 6/2003 | Whitesmith et al. | |
| 6,593,887 B2 | 7/2003 | Luk et al. | |
| 6,597,680 B1 | 7/2003 | Lindskog et al. | |

(56) References Cited

U.S. PATENT DOCUMENTS

| | | |
|---|---|---|
| 6,607,136 B1 | 8/2003 | Atsmon et al. |
| 6,628,302 B2 | 9/2003 | White et al. |
| 6,632,992 B2 | 10/2003 | Hasegawa |
| 6,633,981 B1 | 10/2003 | Davis |
| 6,645,077 B2 | 11/2003 | Rowe |
| 6,647,417 B1 | 11/2003 | Hunter et al. |
| 6,657,538 B1 | 12/2003 | Ritter |
| 6,658,566 B1 | 12/2003 | Hazard |
| 6,667,684 B1 | 12/2003 | Waggamon et al. |
| 6,669,096 B1 | 12/2003 | Saphar et al. |
| 6,671,808 B1 | 12/2003 | Abbott et al. |
| 6,683,954 B1 | 1/2004 | Searle |
| 6,697,944 B1 | 2/2004 | Jones et al. |
| 6,709,333 B1 | 3/2004 | Bradford et al. |
| 6,711,464 B1 | 3/2004 | Yap et al. |
| 6,714,168 B2 | 3/2004 | Berenbaum |
| 6,715,246 B1 | 4/2004 | Frecska et al. |
| 6,728,397 B2 | 4/2004 | McNeal |
| 6,737,955 B2 | 5/2004 | Ghabra et al. |
| 6,758,394 B2 | 7/2004 | Maskatiya et al. |
| 6,771,969 B1 | 8/2004 | Chinoy et al. |
| 6,775,655 B1 | 8/2004 | Peinado et al. |
| 6,785,474 B2 | 8/2004 | Hirt et al. |
| 6,788,640 B2 | 9/2004 | Celeste |
| 6,788,924 B1 | 9/2004 | Knutson et al. |
| 6,795,425 B1 | 9/2004 | Raith |
| 6,804,825 B1 | 10/2004 | White et al. |
| 6,806,887 B2 | 10/2004 | Chernock et al. |
| 6,839,542 B2 | 1/2005 | Sibecas et al. |
| 6,850,147 B2 | 2/2005 | Prokoski et al. |
| 6,853,988 B1 | 2/2005 | Dickinson et al. |
| 6,859,812 B1 | 2/2005 | Poynor |
| 6,861,980 B1 | 3/2005 | Rowitch et al. |
| 6,873,975 B1 | 3/2005 | Hatakeyama et al. |
| 6,879,567 B2 | 4/2005 | Callaway et al. |
| 6,879,966 B1 | 4/2005 | Lapsley et al. |
| 6,886,741 B1 | 5/2005 | Salveson |
| 6,889,067 B2 | 5/2005 | Willey |
| 6,891,822 B1 | 5/2005 | Gubbi et al. |
| 6,892,307 B1 | 5/2005 | Wood et al. |
| 6,930,643 B2 | 8/2005 | Byrne et al. |
| 6,947,003 B2 | 9/2005 | Fluor |
| 6,950,941 B1 | 9/2005 | Lee et al. |
| 6,957,086 B2 | 10/2005 | Bahl et al. |
| 6,963,270 B1 | 11/2005 | Gallagher, III et al. |
| 6,963,971 B1 | 11/2005 | Bush et al. |
| 6,973,576 B2 | 12/2005 | Giobbi |
| 6,975,202 B1 | 12/2005 | Rodriguez et al. |
| 6,980,087 B2 | 12/2005 | Zukowski |
| 6,983,882 B1 | 1/2006 | Cassone |
| 6,999,032 B2 | 2/2006 | Pakray et al. |
| 7,012,503 B2 | 3/2006 | Nielsen |
| 7,031,945 B1 | 4/2006 | Donner |
| 7,049,963 B2 | 5/2006 | Waterhouse et al. |
| 7,055,171 B1 | 5/2006 | Martin et al. |
| 7,058,806 B2 | 6/2006 | Smeets et al. |
| 7,061,380 B1 | 6/2006 | Orlando et al. |
| 7,068,623 B1 | 6/2006 | Barany et al. |
| 7,072,900 B2 | 7/2006 | Sweitzer et al. |
| 7,079,079 B2 | 7/2006 | Jo et al. |
| 7,090,126 B2 | 8/2006 | Kelly et al. |
| 7,100,053 B1 | 8/2006 | Brown et al. |
| 7,111,789 B2 | 9/2006 | Rajasekaran et al. |
| 7,112,138 B2 | 9/2006 | Hedrick et al. |
| 7,119,659 B2 | 10/2006 | Bonalle et al. |
| 7,123,149 B2 | 10/2006 | Nowak et al. |
| 7,130,668 B2 | 10/2006 | Chang et al. |
| 7,137,008 B1 | 11/2006 | Hamid |
| 7,137,012 B1 | 11/2006 | Kamibayashi et al. |
| 7,139,914 B2 | 11/2006 | Arnouse |
| 7,155,416 B2 | 12/2006 | Shatford |
| 7,159,114 B1 | 1/2007 | Zajkowski et al. |
| 7,159,765 B2 | 1/2007 | Frerking |
| 7,167,987 B2 | 1/2007 | Angelo |
| 7,168,089 B2 | 1/2007 | Nguyen et al. |
| 7,167,797 B2 | 2/2007 | Zai et al. |
| 7,191,466 B1 | 3/2007 | Hamid et al. |
| 7,209,955 B1 | 4/2007 | Major et al. |
| 7,218,944 B2 | 5/2007 | Cromer et al. |
| 7,225,161 B2 | 5/2007 | Lam et al. |
| 7,230,908 B2 | 6/2007 | Vanderaar et al. |
| 7,231,068 B2 | 6/2007 | Tibor |
| 7,231,451 B2 | 6/2007 | Law et al. |
| 7,242,923 B2 | 7/2007 | Perera et al. |
| 7,249,177 B1 | 7/2007 | Miller |
| 7,272,723 B1 | 9/2007 | Abbott et al. |
| 7,277,737 B1 | 10/2007 | Vollmer et al. |
| 7,278,025 B2 | 10/2007 | Saito |
| 7,295,119 B2 | 11/2007 | Rappaport et al. |
| 7,305,560 B2 | 12/2007 | Giobbi |
| 7,310,042 B2 | 12/2007 | Seifert |
| 7,314,164 B2 | 1/2008 | Bonalle |
| 7,317,799 B2 | 1/2008 | Hammersmith et al. |
| 7,319,395 B2 | 1/2008 | Puzio et al. |
| 7,330,108 B2 | 2/2008 | Thomas |
| 7,333,002 B2 | 2/2008 | Bixler et al. |
| 7,336,181 B2 | 2/2008 | Nowak et al. |
| 7,336,182 B1 | 2/2008 | Baranowski et al. |
| 7,337,326 B2 | 2/2008 | Palmer et al. |
| 7,341,181 B2 | 3/2008 | Bonalle |
| 7,349,557 B2 | 3/2008 | Tibor |
| 7,356,393 B1 | 4/2008 | Schlatre et al. |
| 7,356,706 B2 | 4/2008 | Scheurich |
| 7,361,919 B2 | 4/2008 | Setlak |
| 7,370,366 B2 | 5/2008 | Lacan et al. |
| 7,380,202 B1 | 5/2008 | Lindhorst et al. |
| 7,382,799 B1 | 6/2008 | Young et al. |
| 7,387,235 B2 | 6/2008 | Gilbert et al. |
| 7,401,731 B1 | 7/2008 | Pletz et al. |
| 7,424,134 B2 | 9/2008 | Chou |
| 7,447,911 B2 | 11/2008 | Chou et al. |
| 7,458,510 B1 | 12/2008 | Zhou |
| 7,460,836 B2 | 12/2008 | Smith et al. |
| 7,461,444 B2 | 12/2008 | Deaett et al. |
| 7,466,232 B2 | 12/2008 | Neuwirth |
| 7,472,280 B2 | 12/2008 | Giobbi |
| 7,512,806 B2 | 3/2009 | Lemke |
| 7,525,413 B2 | 4/2009 | Jung et al. |
| 7,529,944 B2 | 5/2009 | Hamid |
| 7,545,312 B2 | 6/2009 | Kiang et al. |
| 7,565,329 B2 | 7/2009 | Lapsley et al. |
| 7,573,382 B2 | 8/2009 | Choubey et al. |
| 7,573,841 B2 | 8/2009 | Lee et al. |
| 7,574,734 B2 | 8/2009 | Fedronic et al. |
| 7,583,238 B2 | 9/2009 | Cassen et al. |
| 7,583,643 B2 | 9/2009 | Smith et al. |
| 7,587,611 B2 | 9/2009 | Johnson et al. |
| 7,595,765 B1 | 9/2009 | Hirsch |
| 7,603,564 B2 | 10/2009 | Adachi |
| 7,606,733 B2 | 10/2009 | Shmueli et al. |
| 7,617,523 B2 | 11/2009 | Das et al. |
| 7,620,184 B2 | 11/2009 | Marque Pucheu |
| 7,624,417 B2 | 11/2009 | Dua |
| 7,640,273 B2 | 12/2009 | Wallmeier et al. |
| 7,644,443 B2 | 1/2010 | Matsuyama et al. |
| 7,646,307 B2 | 1/2010 | Plocher et al. |
| 7,652,892 B2 | 1/2010 | Shiu et al. |
| 7,676,380 B2 | 3/2010 | Graves et al. |
| 7,711,152 B1 | 5/2010 | Davida et al. |
| 7,715,593 B1 | 5/2010 | Adams et al. |
| 7,724,717 B2 | 5/2010 | Porras et al. |
| 7,724,720 B2 | 5/2010 | Korpela et al. |
| 7,764,236 B2 | 7/2010 | Hill et al. |
| 7,765,181 B2 | 7/2010 | Thomas et al. |
| 7,773,754 B2 | 8/2010 | Buer et al. |
| 7,774,613 B2 | 8/2010 | Lemke |
| 7,780,082 B2 | 8/2010 | Handa et al. |
| 7,796,551 B1 | 9/2010 | Machiraju et al. |
| 7,813,822 B1 | 10/2010 | Hoffberg |
| 7,865,448 B2 | 1/2011 | Pizarro |
| 7,883,417 B2 | 2/2011 | Bruzzese et al. |
| 7,904,718 B2 | 3/2011 | Giobbi et al. |
| 7,943,868 B2 | 5/2011 | Anders et al. |
| 7,957,536 B2 | 6/2011 | Nolte |

(56) References Cited

U.S. PATENT DOCUMENTS

| | | |
|---|---|---|
| 7,961,078 B1 | 6/2011 | Reynolds et al. |
| 7,984,064 B2 | 7/2011 | Fusari |
| 7,996,514 B2 | 8/2011 | Baumert et al. |
| 8,026,821 B2 | 9/2011 | Reeder et al. |
| 8,036,152 B2 | 10/2011 | Brown et al. |
| 8,077,041 B2 | 12/2011 | Stern et al. |
| 8,081,215 B2 | 12/2011 | Kuo et al. |
| 8,082,160 B2 | 12/2011 | Collins, Jr. et al. |
| 8,089,354 B2 | 1/2012 | Perkins |
| 8,112,066 B2 | 2/2012 | Ben Ayed |
| 8,135,624 B1 | 3/2012 | Ramalingam et al. |
| 8,171,528 B1 | 5/2012 | Brown |
| 8,193,923 B2 | 6/2012 | Rork et al. |
| 8,215,552 B1 | 7/2012 | Rambadt |
| 8,248,263 B2 | 8/2012 | Shervey et al. |
| 8,258,942 B1 | 9/2012 | Lanzone et al. |
| 8,294,554 B2 | 10/2012 | Shoarinejad et al. |
| 8,296,573 B2 | 10/2012 | Bolle et al. |
| 8,307,414 B2 | 11/2012 | Zerfos et al. |
| 8,325,011 B2 | 12/2012 | Butler et al. |
| 8,340,672 B2 | 12/2012 | Brown et al. |
| 8,352,730 B2 | 1/2013 | Giobbi |
| 8,373,562 B1 | 2/2013 | Heinze et al. |
| 8,387,124 B2 | 2/2013 | Smetters et al. |
| 8,390,456 B2 | 3/2013 | Puleston et al. |
| 8,395,484 B2 | 3/2013 | Fullerton |
| 8,410,906 B1 | 4/2013 | Dacus et al. |
| 8,421,606 B2 | 4/2013 | Collins, Jr. et al. |
| 8,424,079 B2 | 4/2013 | Adams et al. |
| 8,432,262 B2 | 4/2013 | Talty et al. |
| 8,433,919 B2 | 4/2013 | Giobbi et al. |
| 8,484,696 B2 | 7/2013 | Gatto et al. |
| 8,494,576 B1 | 7/2013 | Bye et al. |
| 8,508,336 B2 | 8/2013 | Giobbi et al. |
| 8,519,823 B2 | 8/2013 | Rinkes |
| 8,522,019 B2 | 8/2013 | Michaelis |
| 8,558,699 B2 | 10/2013 | Butler et al. |
| 8,577,091 B2 | 11/2013 | Ivanov et al. |
| 8,646,042 B1 | 2/2014 | Brown |
| 8,678,273 B2 | 3/2014 | McNeal |
| 8,738,925 B1 | 5/2014 | Park et al. |
| 8,799,574 B2 | 8/2014 | Corda |
| 8,856,539 B2 | 10/2014 | Weiss |
| 8,914,477 B2 | 12/2014 | Gammon |
| 8,918,854 B1 | 12/2014 | Giobbi |
| 8,931,698 B2 | 1/2015 | Ishikawa et al. |
| 8,979,646 B2 | 3/2015 | Moser et al. |
| 9,037,140 B1 | 5/2015 | Brown |
| 9,049,188 B1 | 6/2015 | Brown |
| 9,230,399 B2 | 1/2016 | Yacenda |
| 9,235,700 B1 | 1/2016 | Brown |
| 9,276,914 B2 | 3/2016 | Woodward et al. |
| 9,305,312 B2 | 4/2016 | Kountotsis et al. |
| 9,405,898 B2 | 8/2016 | Giobbi |
| 9,418,205 B2 | 8/2016 | Giobbi |
| 9,542,542 B2 | 1/2017 | Giobbi et al. |
| 9,679,289 B1 | 6/2017 | Brown |
| 9,892,250 B2 | 2/2018 | Giobbi |
| 10,073,960 B1 | 9/2018 | Brown |
| 10,110,385 B1 | 10/2018 | Rush et al. |
| 2001/0024428 A1 | 9/2001 | Onouchi |
| 2001/0026619 A1 | 10/2001 | Howard |
| 2001/0027121 A1 | 10/2001 | Boesen |
| 2001/0027439 A1 | 10/2001 | Holtzman et al. |
| 2001/0044337 A1 | 11/2001 | Rowe et al. |
| 2002/0004783 A1 | 1/2002 | Paltenghe et al. |
| 2002/0007456 A1 | 1/2002 | Peinado et al. |
| 2002/0010679 A1 | 1/2002 | Felsher |
| 2002/0013772 A1 | 1/2002 | Peinado |
| 2002/0014954 A1 | 2/2002 | Fitzgibbon et al. |
| 2002/0015494 A1 | 2/2002 | Nagai et al. |
| 2002/0019811 A1 | 2/2002 | Lapsley et al. |
| 2002/0022455 A1 | 2/2002 | Salokannel et al. |
| 2002/0023032 A1 | 2/2002 | Pearson |
| 2002/0023217 A1* | 2/2002 | Wheeler ............... G06F 21/32 713/171 |
| 2002/0026424 A1 | 2/2002 | Akashi |
| 2002/0037732 A1 | 3/2002 | Gous et al. |
| 2002/0052193 A1 | 5/2002 | Chetty |
| 2002/0055908 A1 | 5/2002 | Di Giorgio et al. |
| 2002/0056043 A1 | 5/2002 | Glass |
| 2002/0062249 A1 | 5/2002 | Iannacci |
| 2002/0068605 A1 | 6/2002 | Stanley |
| 2002/0071559 A1 | 6/2002 | Christensen |
| 2002/0073042 A1 | 6/2002 | Maritzen et al. |
| 2002/0080969 A1 | 6/2002 | Giobbi |
| 2002/0083318 A1 | 6/2002 | Larose |
| 2002/0086690 A1 | 7/2002 | Takahashi et al. |
| 2002/0089890 A1 | 7/2002 | Fibranz et al. |
| 2002/0091646 A1 | 7/2002 | Lake |
| 2002/0095586 A1* | 7/2002 | Doyle ............... G06F 21/32 713/186 |
| 2002/0095587 A1* | 7/2002 | Doyle ............... G07F 7/1008 713/186 |
| 2002/0098888 A1 | 7/2002 | Rowe et al. |
| 2002/0100798 A1 | 8/2002 | Farrugia et al. |
| 2002/0103027 A1 | 8/2002 | Rowe et al. |
| 2002/0104006 A1 | 8/2002 | Boate |
| 2002/0104019 A1 | 8/2002 | Chatani |
| 2002/0105918 A1 | 8/2002 | Yamada et al. |
| 2002/0108049 A1 | 8/2002 | Xu et al. |
| 2002/0109580 A1* | 8/2002 | Shreve ............... G07C 9/00103 340/5.61 |
| 2002/0111919 A1 | 8/2002 | Weller et al. |
| 2002/0116615 A1 | 8/2002 | Nguyen |
| 2002/0124251 A1 | 9/2002 | Hunter et al. |
| 2002/0128017 A1 | 9/2002 | Virtanen |
| 2002/0129262 A1* | 9/2002 | Kutaragi ............... G06F 21/10 713/193 |
| 2002/0138438 A1* | 9/2002 | Bardwell ............... G06F 21/32 705/51 |
| 2002/0138767 A1 | 9/2002 | Hamid et al. |
| 2002/0140542 A1 | 10/2002 | Prokoski et al. |
| 2002/0141586 A1 | 10/2002 | Margalit et al. |
| 2002/0143623 A1 | 10/2002 | Dayley |
| 2002/0143655 A1 | 10/2002 | Elston et al. |
| 2002/0144117 A1 | 10/2002 | Faigle |
| 2002/0147653 A1 | 10/2002 | Shmueli et al. |
| 2002/0148892 A1* | 10/2002 | Bardwell ............... G06F 21/32 235/380 |
| 2002/0150282 A1 | 10/2002 | Kinsella |
| 2002/0152391 A1 | 10/2002 | Willins et al. |
| 2002/0153996 A1 | 10/2002 | Chan et al. |
| 2002/0158121 A1* | 10/2002 | Stanford-Clark ...... G06Q 20/341 235/375 |
| 2002/0158750 A1 | 10/2002 | Almalik |
| 2002/0158765 A1 | 10/2002 | Pape et al. |
| 2002/0160820 A1 | 10/2002 | Winkler |
| 2002/0174348 A1 | 11/2002 | Ting |
| 2002/0177460 A1 | 11/2002 | Beasley et al. |
| 2002/0178063 A1 | 11/2002 | Gravelle et al. |
| 2002/0191816 A1 | 12/2002 | Maritzen et al. |
| 2002/0196963 A1* | 12/2002 | Bardwell ............... G06F 21/32 382/124 |
| 2002/0199120 A1 | 12/2002 | Schmidt |
| 2003/0022701 A1 | 1/2003 | Gupta |
| 2003/0034877 A1 | 2/2003 | Miller et al. |
| 2003/0036416 A1 | 2/2003 | Pattabiraman et al. |
| 2003/0036425 A1 | 2/2003 | Kaminkow et al. |
| 2003/0046228 A1 | 3/2003 | Berney |
| 2003/0046552 A1 | 3/2003 | Hamid |
| 2003/0051173 A1* | 3/2003 | Krueger ............... G06F 21/32 726/21 |
| 2003/0054868 A1 | 3/2003 | Paulsen et al. |
| 2003/0054881 A1 | 3/2003 | Hedrick et al. |
| 2003/0055689 A1 | 3/2003 | Block et al. |
| 2003/0063619 A1 | 4/2003 | Montano et al. |
| 2003/0079133 A1 | 4/2003 | Breiter et al. |
| 2003/0088441 A1 | 5/2003 | McNerney |
| 2003/0109274 A1 | 6/2003 | Budka et al. |
| 2003/0115351 A1 | 6/2003 | Giobbi |
| 2003/0115474 A1 | 6/2003 | Khan |

(56) References Cited

U.S. PATENT DOCUMENTS

| | | |
|---|---|---|
| 2003/0117969 A1 | 6/2003 | Koo et al. |
| 2003/0117980 A1 | 6/2003 | Kim et al. |
| 2003/0120934 A1* | 6/2003 | Ortiz .................. H04L 63/0861 713/186 |
| 2003/0127511 A1 | 7/2003 | Kelly et al. |
| 2003/0128866 A1 | 7/2003 | McNeal |
| 2003/0137404 A1 | 7/2003 | Bonneau, Jr. et al. |
| 2003/0139190 A1 | 7/2003 | Steelberg et al. |
| 2003/0146835 A1 | 8/2003 | Carter |
| 2003/0149744 A1 | 8/2003 | Bierre |
| 2003/0163388 A1 | 8/2003 | Beane |
| 2003/0167207 A1 | 9/2003 | Berardi et al. |
| 2003/0169697 A1 | 9/2003 | Suzuki et al. |
| 2003/0172037 A1 | 9/2003 | Jung |
| 2003/0174839 A1 | 9/2003 | Yamagata et al. |
| 2003/0176218 A1 | 9/2003 | LeMay et al. |
| 2003/0186739 A1 | 10/2003 | Paulsen et al. |
| 2003/0195842 A1 | 10/2003 | Reece |
| 2003/0213840 A1 | 11/2003 | Livingston et al. |
| 2003/0223394 A1 | 12/2003 | Parantainen et al. |
| 2003/0225703 A1 | 12/2003 | Angel |
| 2003/0226031 A1 | 12/2003 | Proudler et al. |
| 2003/0233458 A1 | 12/2003 | Kwon et al. |
| 2004/0002347 A1 | 1/2004 | Hoctor et al. |
| 2004/0015403 A1 | 1/2004 | Moskowitz et al. |
| 2004/0022384 A1* | 2/2004 | Flores .................. H04M 3/38 379/265.13 |
| 2004/0029620 A1 | 2/2004 | Karaoguz |
| 2004/0029635 A1 | 2/2004 | Giobbi |
| 2004/0030764 A1 | 2/2004 | Birk et al. |
| 2004/0030894 A1 | 2/2004 | Labrou et al. |
| 2004/0035644 A1 | 2/2004 | Ford et al. |
| 2004/0039909 A1 | 2/2004 | Cheng |
| 2004/0048570 A1 | 3/2004 | Oba et al. |
| 2004/0048609 A1 | 3/2004 | Kosaka |
| 2004/0059682 A1 | 3/2004 | Hasumi et al. |
| 2004/0059912 A1 | 3/2004 | Zizzi |
| 2004/0064728 A1 | 4/2004 | Scheurich |
| 2004/0068656 A1 | 4/2004 | Lu |
| 2004/0073792 A1 | 4/2004 | Noble et al. |
| 2004/0081127 A1 | 4/2004 | Gardner et al. |
| 2004/0082385 A1 | 4/2004 | Silva et al. |
| 2004/0098597 A1 | 5/2004 | Giobbi |
| 2004/0114563 A1 | 6/2004 | Shvodian |
| 2004/0117644 A1 | 6/2004 | Colvin |
| 2004/0123106 A1 | 6/2004 | D'Angelo et al. |
| 2004/0123127 A1 | 6/2004 | Teicher |
| 2004/0127277 A1 | 7/2004 | Walker et al. |
| 2004/0128162 A1 | 7/2004 | Schlotterbeck et al. |
| 2004/0128389 A1 | 7/2004 | Kopchik |
| 2004/0128500 A1 | 7/2004 | Cihula et al. |
| 2004/0128508 A1 | 7/2004 | Wheeler et al. |
| 2004/0129787 A1* | 7/2004 | Saito .................. G06K 19/07 235/492 |
| 2004/0137912 A1 | 7/2004 | Lin |
| 2004/0158746 A1 | 8/2004 | Hu et al. |
| 2004/0166875 A1 | 8/2004 | Jenkins et al. |
| 2004/0167465 A1 | 8/2004 | Mihai et al. |
| 2004/0193925 A1 | 9/2004 | Safriel |
| 2004/0203923 A1 | 10/2004 | Mullen |
| 2004/0208139 A1 | 10/2004 | Iwamura |
| 2004/0209690 A1 | 10/2004 | Bruzzese et al. |
| 2004/0209692 A1 | 10/2004 | Schober et al. |
| 2004/0214582 A1 | 10/2004 | Lan et al. |
| 2004/0215615 A1 | 10/2004 | Larsson et al. |
| 2004/0217859 A1 | 11/2004 | Pucci et al. |
| 2004/0218581 A1 | 11/2004 | Cattaneo |
| 2004/0222877 A1 | 11/2004 | Teramura et al. |
| 2004/0230488 A1 | 11/2004 | Beenau et al. |
| 2004/0234117 A1 | 11/2004 | Tibor |
| 2004/0243519 A1 | 12/2004 | Perttila et al. |
| 2004/0246103 A1 | 12/2004 | Zukowski |
| 2004/0246950 A1 | 12/2004 | Parker et al. |
| 2004/0252659 A1 | 12/2004 | Yun et al. |
| 2004/0253996 A1 | 12/2004 | Chen et al. |
| 2004/0254837 A1 | 12/2004 | Roshkoff |
| 2004/0255139 A1 | 12/2004 | Giobbi |
| 2004/0255145 A1 | 12/2004 | Chow |
| 2005/0001028 A1 | 1/2005 | Zuili |
| 2005/0002028 A1 | 1/2005 | Kasapi et al. |
| 2005/0005136 A1* | 1/2005 | Chen .................. H04L 9/3073 713/186 |
| 2005/0006452 A1 | 1/2005 | Aupperle |
| 2005/0025093 A1 | 2/2005 | Yun et al. |
| 2005/0028168 A1 | 2/2005 | Marcjan |
| 2005/0035897 A1 | 2/2005 | Perl et al. |
| 2005/0039027 A1* | 2/2005 | Shapiro .................. G06F 21/32 713/186 |
| 2005/0040961 A1 | 2/2005 | Tuttle |
| 2005/0047386 A1 | 3/2005 | Yi |
| 2005/0049013 A1 | 3/2005 | Chang et al. |
| 2005/0050208 A1 | 3/2005 | Chatani |
| 2005/0050324 A1 | 3/2005 | Corbett et al. |
| 2005/0054431 A1 | 3/2005 | Walker et al. |
| 2005/0055242 A1 | 3/2005 | Bello et al. |
| 2005/0055244 A1 | 3/2005 | Mullan et al. |
| 2005/0058292 A1 | 3/2005 | Diorio et al. |
| 2005/0074126 A1* | 4/2005 | Stanko .................. H04L 63/0807 380/279 |
| 2005/0076242 A1 | 4/2005 | Breuer |
| 2005/0081040 A1 | 4/2005 | Johnson et al. |
| 2005/0086115 A1 | 4/2005 | Pearson |
| 2005/0089000 A1 | 4/2005 | Bae et al. |
| 2005/0090200 A1 | 4/2005 | Karaoguz et al. |
| 2005/0091338 A1 | 4/2005 | de la Huerga |
| 2005/0094657 A1 | 5/2005 | Sung et al. |
| 2005/0097037 A1 | 5/2005 | Tibor |
| 2005/0105600 A1 | 5/2005 | Culum et al. |
| 2005/0105734 A1 | 5/2005 | Buer |
| 2005/0108164 A1 | 5/2005 | Salafia et al. |
| 2005/0109836 A1 | 5/2005 | Ben-Aissa |
| 2005/0109841 A1 | 5/2005 | Ryan et al. |
| 2005/0113070 A1 | 5/2005 | Okabe |
| 2005/0114149 A1 | 5/2005 | Rodriguez et al. |
| 2005/0114150 A1 | 5/2005 | Franklin |
| 2005/0116020 A1 | 6/2005 | Smolucha et al. |
| 2005/0119979 A1 | 6/2005 | Murashita et al. |
| 2005/0124294 A1 | 6/2005 | Wentink |
| 2005/0138390 A1 | 6/2005 | Adams et al. |
| 2005/0138576 A1 | 6/2005 | Baumert et al. |
| 2005/0139656 A1 | 6/2005 | Arnouse |
| 2005/0141451 A1 | 6/2005 | Yoon et al. |
| 2005/0152394 A1 | 7/2005 | Cho |
| 2005/0154897 A1 | 7/2005 | Holloway et al. |
| 2005/0169292 A1 | 8/2005 | Young |
| 2005/0180385 A1 | 8/2005 | Jeong et al. |
| 2005/0182661 A1 | 8/2005 | Allard et al. |
| 2005/0182975 A1 | 8/2005 | Guo et al. |
| 2005/0187792 A1 | 8/2005 | Harper |
| 2005/0195975 A1 | 9/2005 | Kawakita |
| 2005/0200453 A1 | 9/2005 | Turner |
| 2005/0201389 A1 | 9/2005 | Shimanuki et al. |
| 2005/0210270 A1 | 9/2005 | Rohatgi et al. |
| 2005/0212657 A1* | 9/2005 | Simon .................. G06F 21/32 340/5.74 |
| 2005/0215233 A1 | 9/2005 | Perera et al. |
| 2005/0216313 A1 | 9/2005 | Claud et al. |
| 2005/0216639 A1 | 9/2005 | Sparer et al. |
| 2005/0220046 A1 | 10/2005 | Falck et al. |
| 2005/0229007 A1 | 10/2005 | Bolle et al. |
| 2005/0229240 A1 | 10/2005 | Nanba |
| 2005/0242921 A1 | 11/2005 | Zimmerman et al. |
| 2005/0243787 A1 | 11/2005 | Hong et al. |
| 2005/0251688 A1 | 11/2005 | Nanavati et al. |
| 2005/0253683 A1 | 11/2005 | Lowe |
| 2005/0264416 A1 | 12/2005 | Maurer |
| 2005/0269401 A1 | 12/2005 | Spitzer et al. |
| 2005/0272403 A1 | 12/2005 | Ryu et al. |
| 2005/0281320 A1 | 12/2005 | Neugebauer |
| 2005/0282558 A1 | 12/2005 | Choi et al. |
| 2005/0284932 A1 | 12/2005 | Sukeda et al. |
| 2006/0001525 A1 | 1/2006 | Nitzan et al. |
| 2006/0014430 A1 | 1/2006 | Liang et al. |
| 2006/0022042 A1 | 2/2006 | Smets et al. |

(56) References Cited

U.S. PATENT DOCUMENTS

| | | |
|---|---|---|
| 2006/0022046 A1 | 2/2006 | Iwamura |
| 2006/0022800 A1 | 2/2006 | Krishna et al. |
| 2006/0025180 A1 | 2/2006 | Rajkotia et al. |
| 2006/0026673 A1 | 2/2006 | Tsuchida |
| 2006/0030353 A1 | 2/2006 | Jun |
| 2006/0034250 A1 | 2/2006 | Kim et al. |
| 2006/0041746 A1 | 2/2006 | Kirkup et al. |
| 2006/0058102 A1 | 3/2006 | Nguyen et al. |
| 2006/0063575 A1 | 3/2006 | Gatto et al. |
| 2006/0069814 A1 | 3/2006 | Abraham et al. |
| 2006/0072586 A1 | 4/2006 | Callaway, Jr. et al. |
| 2006/0074713 A1 | 4/2006 | Conry et al. |
| 2006/0076401 A1 | 4/2006 | Frerking |
| 2006/0078176 A1 | 4/2006 | Abiko et al. |
| 2006/0087407 A1 | 4/2006 | Stewart et al. |
| 2006/0089138 A1 | 4/2006 | Smith et al. |
| 2006/0097949 A1 | 5/2006 | Luebke et al. |
| 2006/0111955 A1 | 5/2006 | Winter et al. |
| 2006/0113381 A1 | 6/2006 | Hochstein et al. |
| 2006/0136728 A1 | 6/2006 | Gentry et al. |
| 2006/0136742 A1 | 6/2006 | Giobbi |
| 2006/0143441 A1 | 6/2006 | Giobbi |
| 2006/0144943 A1 | 7/2006 | Kim |
| 2006/0156027 A1 | 7/2006 | Blake |
| 2006/0158308 A1 | 7/2006 | McMullen et al. |
| 2006/0165060 A1 | 7/2006 | Dua |
| 2006/0170565 A1 | 8/2006 | Husak et al. |
| 2006/0173991 A1 | 8/2006 | Piikivi |
| 2006/0187029 A1 | 8/2006 | Thomas |
| 2006/0190348 A1 | 8/2006 | Ofer et al. |
| 2006/0190413 A1 | 8/2006 | Harper |
| 2006/0194598 A1 | 8/2006 | Kim et al. |
| 2006/0195576 A1 | 8/2006 | Rinne et al. |
| 2006/0198337 A1 | 9/2006 | Hoang et al. |
| 2006/0205408 A1 | 9/2006 | Nakagawa et al. |
| 2006/0208066 A1 | 9/2006 | Finn et al. |
| 2006/0208853 A1 | 9/2006 | Kung et al. |
| 2006/0222042 A1 | 10/2006 | Teramura et al. |
| 2006/0229909 A1 | 10/2006 | Kaila et al. |
| 2006/0237528 A1 | 10/2006 | Bishop et al. |
| 2006/0238305 A1 | 10/2006 | Loving et al. |
| 2006/0268891 A1 | 11/2006 | Heidari-Bateni et al. |
| 2006/0273176 A1 | 12/2006 | Audebert et al. |
| 2006/0274711 A1 | 12/2006 | Nelson, Jr. et al. |
| 2006/0279412 A1 | 12/2006 | Holland et al. |
| 2006/0286969 A1 | 12/2006 | Talmor et al. |
| 2006/0290580 A1 | 12/2006 | Noro et al. |
| 2006/0293925 A1 | 12/2006 | Flom |
| 2006/0294388 A1 | 12/2006 | Abraham et al. |
| 2007/0005403 A1 | 1/2007 | Kennedy et al. |
| 2007/0007331 A1 | 1/2007 | Jasper et al. |
| 2007/0008070 A1 | 1/2007 | Friedrich |
| 2007/0008916 A1 | 1/2007 | Haugli et al. |
| 2007/0016800 A1 | 1/2007 | Spottswood et al. |
| 2007/0019845 A1 | 1/2007 | Kato |
| 2007/0029381 A1 | 2/2007 | Braiman |
| 2007/0032288 A1 | 2/2007 | Nelson et al. |
| 2007/0033072 A1 | 2/2007 | Bildirici |
| 2007/0033150 A1 | 2/2007 | Nwosu |
| 2007/0038751 A1 | 2/2007 | Jorgensen |
| 2007/0050259 A1 | 3/2007 | Wesley |
| 2007/0060095 A1 | 3/2007 | Subrahmanya et al. |
| 2007/0060319 A1 | 3/2007 | Block et al. |
| 2007/0064742 A1 | 3/2007 | Shvodian |
| 2007/0069852 A1 | 3/2007 | Mo et al. |
| 2007/0072636 A1 | 3/2007 | Worfolk et al. |
| 2007/0073553 A1 | 3/2007 | Flinn et al. |
| 2007/0084523 A1 | 4/2007 | McLean |
| 2007/0087682 A1 | 4/2007 | DaCosta |
| 2007/0087834 A1 | 4/2007 | Moser et al. |
| 2007/0100939 A1 | 5/2007 | Bagley et al. |
| 2007/0109117 A1 | 5/2007 | Heitzmann et al. |
| 2007/0112676 A1 | 5/2007 | Kontio et al. |
| 2007/0118891 A1 | 5/2007 | Buer |
| 2007/0133478 A1 | 6/2007 | Armbruster et al. |
| 2007/0136407 A1 | 6/2007 | Rudelic |
| 2007/0152826 A1 | 7/2007 | August et al. |
| 2007/0156850 A1 | 7/2007 | Corrion |
| 2007/0158411 A1 | 7/2007 | Krieg, Jr. |
| 2007/0159301 A1 | 7/2007 | Hirt et al. |
| 2007/0159994 A1 | 7/2007 | Brown et al. |
| 2007/0169121 A1 | 7/2007 | Hunt et al. |
| 2007/0174809 A1 | 7/2007 | Brown et al. |
| 2007/0176756 A1 | 8/2007 | Friedrich |
| 2007/0187266 A1 | 8/2007 | Porter et al. |
| 2007/0192601 A1 | 8/2007 | Spain et al. |
| 2007/0194882 A1 | 8/2007 | Yokota et al. |
| 2007/0204078 A1 | 8/2007 | Boccon-Gibod et al. |
| 2007/0205860 A1 | 9/2007 | Jones et al. |
| 2007/0205861 A1 | 9/2007 | Nair et al. |
| 2007/0213048 A1 | 9/2007 | Trauberg |
| 2007/0214492 A1 | 9/2007 | Gopi et al. |
| 2007/0218921 A1 | 9/2007 | Lee et al. |
| 2007/0219926 A1 | 9/2007 | Korn |
| 2007/0220272 A1 | 9/2007 | Campisi et al. |
| 2007/0229268 A1 | 10/2007 | Swan et al. |
| 2007/0245157 A1 | 10/2007 | Giobbi et al. |
| 2007/0245158 A1 | 10/2007 | Giobbi et al. |
| 2007/0247366 A1 | 10/2007 | Smith et al. |
| 2007/0260883 A1 | 11/2007 | Giobbi et al. |
| 2007/0260888 A1 | 11/2007 | Giobbi et al. |
| 2007/0266257 A1 | 11/2007 | Camaisa et al. |
| 2007/0268862 A1 | 11/2007 | Singh et al. |
| 2007/0271194 A1 | 11/2007 | Walker et al. |
| 2007/0271433 A1 | 11/2007 | Takemura |
| 2007/0277044 A1 | 11/2007 | Graf et al. |
| 2007/0285212 A1 | 12/2007 | Rotzoll |
| 2007/0285238 A1 | 12/2007 | Batra |
| 2007/0288263 A1 | 12/2007 | Rodgers |
| 2007/0288752 A1 | 12/2007 | Chan |
| 2007/0293155 A1 | 12/2007 | Liao et al. |
| 2007/0294755 A1 | 12/2007 | Dadhia et al. |
| 2007/0296544 A1 | 12/2007 | Beenau et al. |
| 2008/0001783 A1 | 1/2008 | Cargonja et al. |
| 2008/0005432 A1 | 1/2008 | Kagawa |
| 2008/0008359 A1 | 1/2008 | Beenau et al. |
| 2008/0011842 A1 | 1/2008 | Curry et al. |
| 2008/0012685 A1 | 1/2008 | Friedrich et al. |
| 2008/0012767 A1 | 1/2008 | Caliri et al. |
| 2008/0016004 A1 | 1/2008 | Kurasaki et al. |
| 2008/0019578 A1 | 1/2008 | Saito et al. |
| 2008/0028453 A1 | 1/2008 | Nguyen et al. |
| 2008/0046715 A1 | 2/2008 | Balazs et al. |
| 2008/0061941 A1 | 3/2008 | Fischer et al. |
| 2008/0071577 A1 | 3/2008 | Highley |
| 2008/0072063 A1 | 3/2008 | Takahashi et al. |
| 2008/0088475 A1 | 4/2008 | Martin |
| 2008/0090548 A1 | 4/2008 | Ramalingam |
| 2008/0095359 A1 | 4/2008 | Schreyer et al. |
| 2008/0109895 A1 | 5/2008 | Janevski |
| 2008/0111752 A1 | 5/2008 | Lindackers et al. |
| 2008/0129450 A1 | 6/2008 | Riegebauer |
| 2008/0148351 A1 | 6/2008 | Bhatia et al. |
| 2008/0149705 A1 | 6/2008 | Giobbi et al. |
| 2008/0150678 A1 | 6/2008 | Giobbi et al. |
| 2008/0156866 A1 | 7/2008 | McNeal |
| 2008/0164997 A1 | 7/2008 | Aritsuka et al. |
| 2008/0169909 A1 | 7/2008 | Park et al. |
| 2008/0186166 A1 | 8/2008 | Zhou et al. |
| 2008/0188308 A1 | 8/2008 | Shepherd et al. |
| 2008/0201768 A1 | 8/2008 | Koo et al. |
| 2008/0209571 A1 | 8/2008 | Bhaskar et al. |
| 2008/0218416 A1 | 9/2008 | Handy et al. |
| 2008/0222701 A1 | 9/2008 | Saaranen et al. |
| 2008/0228524 A1 | 9/2008 | Brown |
| 2008/0235144 A1 | 9/2008 | Phillips |
| 2008/0238625 A1 | 10/2008 | Rofougaran et al. |
| 2008/0250388 A1 | 10/2008 | Meyer et al. |
| 2008/0251579 A1 | 10/2008 | Larsen |
| 2008/0278325 A1 | 11/2008 | Zimman et al. |
| 2008/0289032 A1 | 11/2008 | Aoki et al. |
| 2008/0313728 A1 | 12/2008 | Pandrangi et al. |
| 2008/0314971 A1 | 12/2008 | Faith et al. |
| 2008/0316045 A1 | 12/2008 | Sriharto et al. |

(56) References Cited

U.S. PATENT DOCUMENTS

| | | |
|---|---|---|
| 2009/0002134 A1 | 1/2009 | McAllister |
| 2009/0016573 A1 | 1/2009 | McAfee, II et al. |
| 2009/0024584 A1 | 1/2009 | Dharap et al. |
| 2009/0033464 A1 | 2/2009 | Friedrich |
| 2009/0033485 A1 | 2/2009 | Naeve et al. |
| 2009/0036164 A1 | 2/2009 | Rowley |
| 2009/0045916 A1 | 2/2009 | Nitzan et al. |
| 2009/0052389 A1 | 2/2009 | Qin et al. |
| 2009/0076849 A1 | 3/2009 | Diller |
| 2009/0081996 A1 | 3/2009 | Duggal et al. |
| 2009/0096580 A1 | 4/2009 | Paananen |
| 2009/0140045 A1 | 6/2009 | Evans |
| 2009/0157512 A1 | 6/2009 | King |
| 2009/0176566 A1 | 7/2009 | Kelly |
| 2009/0199206 A1 | 8/2009 | Finkenzeller et al. |
| 2009/0237245 A1 | 9/2009 | Brinton et al. |
| 2009/0237253 A1 | 9/2009 | Neuwirth |
| 2009/0239667 A1 | 9/2009 | Rowe et al. |
| 2009/0310514 A1 | 12/2009 | Jeon et al. |
| 2009/0313689 A1 | 12/2009 | Nystrom et al. |
| 2009/0319788 A1 | 12/2009 | Zick et al. |
| 2009/0320118 A1 | 12/2009 | Muller et al. |
| 2009/0322510 A1 | 12/2009 | Berger et al. |
| 2009/0328182 A1 | 12/2009 | Malakapalli et al. |
| 2010/0007498 A1 | 1/2010 | Jackson |
| 2010/0023074 A1 | 1/2010 | Powers et al. |
| 2010/0037255 A1 | 2/2010 | Sheehan et al. |
| 2010/0077214 A1 | 3/2010 | Jogand-Coulomb et al. |
| 2010/0117794 A1 | 5/2010 | Adams et al. |
| 2010/0134257 A1 | 6/2010 | Puleston et al. |
| 2010/0169442 A1 | 7/2010 | Liu et al. |
| 2010/0169964 A1 | 7/2010 | Liu et al. |
| 2010/0174911 A1 | 7/2010 | Isshiki |
| 2010/0188226 A1 | 7/2010 | Seder et al. |
| 2010/0277283 A1 | 11/2010 | Burkart et al. |
| 2010/0277286 A1 | 11/2010 | Burkart et al. |
| 2010/0291896 A1 | 11/2010 | Corda |
| 2010/0305843 A1 | 12/2010 | Yan et al. |
| 2010/0328033 A1 | 12/2010 | Kamei |
| 2011/0072034 A1 | 3/2011 | Sly et al. |
| 2011/0072132 A1 | 3/2011 | Shafer et al. |
| 2011/0082735 A1 | 4/2011 | Kannan et al. |
| 2011/0116358 A9 | 5/2011 | Li et al. |
| 2011/0126188 A1 | 5/2011 | Bernstein et al. |
| 2011/0227740 A1 | 9/2011 | Wohltjen |
| 2011/0238517 A1 | 9/2011 | Ramalingam et al. |
| 2011/0246790 A1 | 10/2011 | Koh et al. |
| 2011/0266348 A1 | 11/2011 | Denniston, Jr. |
| 2011/0307599 A1 | 12/2011 | Saretto et al. |
| 2012/0086571 A1 | 4/2012 | Scalisi et al. |
| 2012/0182123 A1 | 7/2012 | Butler et al. |
| 2012/0212322 A1 | 8/2012 | Idsoe |
| 2012/0226907 A1 | 9/2012 | Hohberger |
| 2013/0019295 A1 | 1/2013 | Park et al. |
| 2013/0019323 A1 | 1/2013 | Arvidsson et al. |
| 2013/0044111 A1 | 2/2013 | VanGilder et al. |
| 2013/0111543 A1 | 5/2013 | Brown et al. |
| 2013/0276140 A1 | 10/2013 | Coffing et al. |
| 2013/0331063 A1 | 12/2013 | Cormier et al. |
| 2014/0074696 A1 | 3/2014 | Glaser |
| 2014/0266713 A1 | 9/2014 | Sehgal et al. |
| 2016/0210614 A1 | 7/2016 | Hall |
| 2017/0085564 A1 | 3/2017 | Giobbi et al. |

FOREIGN PATENT DOCUMENTS

| | | |
|---|---|---|
| WO | 0122724 A1 | 3/2001 |
| WO | 0135334 A1 | 5/2001 |
| WO | 0175876 A1 | 10/2001 |
| WO | 0177790 A1 | 10/2001 |
| WO | 05050450 | 10/2001 |
| WO | 05086802 | 10/2001 |
| WO | 2004/038563 | 5/2004 |
| WO | 2007/087558 | 8/2007 |

OTHER PUBLICATIONS

"Geetha Govindan, Suresh Kumar Bakakrishnan, Rejith Lalitha Ratheendran, Saji Koyippurathu Sivadasan, Real time security management using RFID, Biometric and Smart Messages, Aug. 20-22, 2009, IEEE Xplore, INSPEC # 10906130" (Year: 2009).*

"Sweta Singh, Akhilesh Singh, Rakesh Kumar, A constraint-based biometric scheme on ATM and swiping machine, Mar. 11-13, 2016, IEEE Xplore, INSPEC $ 16156324" (Year: 2016).*

Vainio, Juha., "Bluetooth Security", dated 2000, Helskinki University of Technology, p. 1-20.

Katz et al., "Smart Cards and Biometrics in Privacy-Sensitive Secure Personal Identification System", dated 2002, Smart Card Alliance, p. 1-29.

Dai et al., "Toward Blockchain-Based Accounting and Assurance", 2017, Journal of Information Systems, pp. 5-21 (Year: 2017).

Alliance Activities: Publications: Identity-Smart Card Alliance, Smart Card Alliance, 1997-2007, [online] [Retrieved on Jan. 7, 2007] Retrieved from the Internet, https://www.smartcardalliance.org/pages/publications-identity.

Antonoff, Michael, Visiting Video Valley, Sound Vision, pp. 116 and 118-119, Nov. 2001.

Applying Biometrics to Door Access, Security Magazine, Sep. 26, 2002 [online] [Retrieved on Jan. 7, 2007] Retrieved from the Internet http://www.securitymagazine.com/CDA/Articles/Technologies/3ae610eaa34d8010VgnVCM100000f932a8c0.

BioPay, LLC, Frequently Asked Questions (FAQs) About BioPay, BioPay, LLC, 2007, [online] [Retrieved on Jan. 1, 2007] Retrieved from the Internet http://www.biopay.com/faqs-lowes.asp.

Bluetooth, www.bluetoothcom, Printed Jlllle 1, 2000.

Blum, Jonathan , Digital Rights Managment May Solve The Napster Problem, Technoloav Investor Industrvsector (Oct. 2000),24-27.

Content protection plan targets wireless home networks, www.eetimes.com, Jan. 11, 2002.

Debow, Credit/Debit Debuts in Midwest Smart Card Test, Computers in Banking, v6, n11, p. 10, Nov. 1989.

Dennis, Digital Passports Need Not Infringe Civil Liberties, Newsbytes, Dec. 2, 1999, 2 pages.

Farouk, Authentication Mechanisms in Grid Computing Environment Comparative Study, 2012, IEEE, p. 1-6.

Fasca, Chad. The Circuit, Electronic News 45(45). (Nov. 8, 1999),20.

Firecrest Shows How Truly Commercially-Minded Companies Will Exploit the Internet, Computergram International, Jan. 18, 1996. 2pgs.

Kontzer, Tony , Thomson Bets on Smart Cards for Video Encryption, www.informationweek.com, Jun. 7, 2001 (Also listed under Press Release).

Lake, Matt. Downloading for Dollars, Sound Vision. (Nov. 2000),137-138.

Lewis, Sony and Visa in On-Line Entertainment Venture, New York Times, v145, Nov. 16, 1995. 1 pg.

Liu et al. 2001. A Practical Guide to Biometric Security Technology. IT Professional 3, 1 (Jan. 2001), 27-32. DOI=10.1109/6294_899930 http://dx.doi.org/10.1109/6294.899930.

McIver, R. et al., Identification and Verification Working Together, BioscryptTM, Aug. 27, 2004, [online] [Retrieved on Jan. 7, 2007] Retrieved from the Internet http://www.ibia.org/membersadmin/whitepapers/pdf/15/Identification%20and%20Verification%20Working%20Together.pdf.

Micronas and Thomson multimedia Showcase a New Copy Protection System That Will Drive the Future of Digital Television, www.micronas.com, Jan. 8, 2002.

Nilsson, J. et al., Match-On-Card for Java Cards, Precise Biometrics, White Paper, Apr. 2004, [online] [Retrieved on Jan. 7, 2007] Retrieved from the Internet http://www.ibia.org/membersadmin/whitepapers/pdf/17/Precise%20Match-on-Card%20for%20Java%20Cards.pdf.

Nordin, B., Match-On-Card Technology, PreciseTM Biometrics, White Paper, Apr. 2004, [online] [Retrieved on Jan. 7, 2007] Retrieved from the Internet http://www.ibia.org/membersadmin/whitepapers/pdf/17/Precise%20Match-on-Card%20technology.pdf.

(56) References Cited

OTHER PUBLICATIONS

Paget, Paul, The Security Behind Secure Extranets, Enterprise Systems Journal, (Dec. 1999), 4 pgs.
PCT International Search Report and Written Opinion, PCT/US04/38124, dated Apr. 7, 2005, 10 pages.
PCT International Search Report and Written Opinion, PCT/US05/07535, dated Dec. 6, 2005, 6 pages.
PCT International Search Report and Written Opinion, PCT/US05/43447, dated Feb. 22, 2007, 7 pages.
PCT International Search Report and Written Opinion, PCT/US05/46843, dated Mar. 1, 2007, 10 pages.
PCT International Search Report and Written Opinion, PCT/US07/11103, dated Apr. 23, 2008, 9 pages.
PCT International Search Report and Written Opinion, PCT/US07/11105, dated Oct. 20, 2008, 10 pages.
PCT International Search Report PCT/US07/11104, Jun. 26, 2008, 9 pages.
PCT International Search Report, PCT/US07/11102, dated Oct. 3, 2008, 11 pages.
Pope, Oasis Digital Signature Services: Digital Signing without the Headaches, Internet Computing IEEE, vol. 10, 2006, pp. 81-84.
SAFModuleTM: A Look Into Strong Authentication, saflink Corporation, [online] [Retrieved on Jan. 7, 2007] Retrieved from the Internet http://www.ibia.org/membersadmin/whitepapers/pdf/6/SAFmod_WP.pdf.
Sapsford, Jathon, E-Business: Sound Waves Could Help Ease Web-Fraud Woes, Wall Street Journal, (Aug. 14, 2000), B1.
Say Hello to Bluetooth, Bluetooth Web site 4 pages.
Smart Card Alliance Report, Contactless Technology for Secure Physical Access: Technology and Standsards Choices, Smart Card Alliance, Oct. 2002, p. 1-48.
Smart Cards and Biometrics White Paper, Smart Card Alliance, May 2002, [online] [Retrieved on Jan. 7, 2007] Retrieved from the Internet http://www.securitymanagement.com/library/smartcard_faqtech0802.pdf.
Thomson multimedia unveils copy protection proposal designed to provide additional layer of digital content security, www.thomson-multimedia.com, May 30, 2001. 2 pgs.
Van Winkle, William, Bluetooth the King of Connectivity, Laptop Buyers Guide and Handbook (Jan. 2000), 148-153.
Wade, W., Using Fingerprints to Make Payments at POS Slowly Gaining Popularity, Credit Union Journal, International Biometric Group, Apr. 21, 2003, online. Retrieved on Jan. 7, 2007. http://www.biometricgroup.com/in_the_news/04.21.03.html.
Wallace, Bob, The Internet Unplugged, InformationWeek, 765(22), (Dec. 13, 1999), 22-24.
Weber, Thomas E., In the Age of Napster, Protecting Copyright is a Digital Arms Race, Wall Street Journal, (Jul. 24, 2000), B1.
What is a File, Apr. 30, 1998, http://unixhelp.ed.ac.uk/editors/whatisafile.html.accessed Mar. 11, 2010 via http://waybackmachine.org/19980615000000*/http://unixhelp.ed.ac.uk/editors/whatisafile.html.
Yoshida, Junko, Content Protection Plan Targets Wireless Home Networks, www.eetimes.com, Jan. 11, 2002, 2 pgs.
Chen, et al. "On Enhancing Biometric Authentication with Data Protection." KES2000. Fourth International Conference on Knowledge-Based Intelligent Engineering Systems and Allied Technologies. Proceedings (Cat. No. 00TH8516), vol. 1, 2000, pp. 249-252 vol. 1.
Noore, A. "Highly Robust Biometric Smart Card Design." IEEE Transactions on Consumer Electronics, vol. 46, No. 4, 2000, pp. 1059-1063.
Anonymous, "Applying Biometrics to Door Access," Security Magazine, Sep. 26, 2002, retrieved from http://www.securitymagazine.com/CDA/Articles/Technologies/3ae610eaa34d8010VgnVCM100000f932a8c0___ on Jan. 7, 2007, 5 pgs.
Anonymous, "IEEE 802.15.4-2006—Wikipedia, the free encyclopedia," Wikipedia, last modified Mar. 21, 2009, retrieved from http://en.wikipedia.org/wiki/IEEE_802.15.4-2006 on Apr. 30, 2009, 5 pgs.

Apple et al., "Smart Card Setup Guide," 2006, downloaded from http://manuals.info.apple.com/en_US/Smart_Card_Setup_Guide.pdf on or before May 3, 2012, 16 pgs.
Balanis, "Antenna Theory: A Review," Jan. 1992, Proceedings of the IEEE, vol. 80, No. 1, p. 13.
Beaufour, "Personal Servers as Digital Keys," Proceedings of the Second IEEE Annual Conference on Pervasive Computing and Communications (PERCOM'04), Mar. 14-17, 2004, pp. 319-328.
Blueproximity, "BlueProximity—Leave it—it's locked, come back, it's back too . . . " Aug. 26, 2007, retrieved from http://blueproximity.sourceforge.net/ via http://www.archive.org/ on or before Oct. 11, 2011, 1 pg.
Bohrsatom et al., "Automatically unlock PC when entering proximity," Dec. 7, 2005, retrieved from http://salling.com/forums/viewtopic.php?t=3190 on or before Oct. 11, 2011, 3 pgs.
Brown, "Techniques for Privacy and Authentication in Personal Communication Systems," Personal Communications, IEEE, Aug. 1995, vol. 2, No. 4, pp. 6-10.
Cisco Systems, Inc., "Antenna Patterns and Their Meaning," 1992-2007, p. 10.
Costa, "Imation USB 2.0 Micro Hard Drive," Nov. 22, 2005, retrieved from http://www.pcmag.com/article2/0,2817,1892209,00.asp on or before Oct. 11, 2011, 2 pgs.
Dagan, "Power over Ethernet (PoE) Midspan—The Smart Path to Providign Power for IP Telephony," Product Manager, Systems, Aug. 2005, Power Dsine Inc., 28 pgs.
Derfler, "How Networks Work," Bestseller Edition, 1996, Ziff-Davis Press, Emeryville, CA, all pages.
Giobbi, Specification of U.S. Appl. No. 60/824,758, filed Sep. 6, 2006, all pages.
Gralla, "How the Internet Works," Millennium Edition, 1999, Que Corporation, Indianapolis, IN, all pages.
Hendron, "File Security, Keychains, Encryptioin, and More with Mac OS X (10.3+)" Apr. 4, 2005, downloaded from http://www.johnhendron.net/documents/OSX_Security.pdf on or before May 3, 2012, 30 pgs.
International Search Report and Written Opinion for International Application No. PCT/US07/00349, dated Mar. 19, 2008, 10 pgs.
International Search Report and Written Opinion for International Application No. PCT/US08/83060, dated Dec. 29, 2008, 9 pgs.
International Search Report and Written Opinion for International Application No. PCT/US08/87835, dated Feb. 11, 2009, 8 pgs.
International Search Report and Written Opinion for International Application No. PCT/US09/34095, dated Mar. 25, 2009, 11 pgs.
International Search Report and Written Opinion for International Application No. PCT/US2009/039943, dated Jun. 1, 2009, 9 pgs.
International Search Report and Written Opinion for International Application No. PCT/US2014/037609, dated Dec. 9, 2014, 13 pgs.
Lee et al., "Effects of dielectric superstrates on a two-layer electromagnetically coupled patch antenna," Antennas and Propagation Society International Symposium, Jun. 1989, AP-S. Digest, vol. 2, pp. 26-30, found at http://ieeexplore.ieee.org/stamp/stamp.jsp?tp=&arnumber=1347.
Muller, "Desktop Encyclopedia of the Internet," 1999, Artech House Inc., Norwood, MA, all pages.
National Criminal Justice Reference Service, "Antenna Types," Dec. 11, 2006, online at http://ncjrs.gov/pdffiles1/nij/185030b.pdf, retrieved from http://web.archive.org/web/*/http://www.ncjrs.gov/pdffiles1/nij/185030b.pdf on Jan. 12, 2011, 1 pg.
Nel et al., "Generation of Keys for use with the Digital Signature Standard (DSS)," Communications and Signal Processing, Proceedings of the 1993 IEEE South African Symposium, Aug. 6, 1993, pp. 6-11.
Nerd Vittles, "magicJack: Could It Be the Asterisk Killer?" Aug. 1, 2007, retrieved from http://nerdvittles.com/index.php?p=187 on or before Oct. 11, 2011, 2 pgs.
Nordin, "Match-on-Card Technology," Precise Biometrics, white paper, Apr. 2004, retrieved from www.ibia.org/membersadmin/whitepapers/pdf/17/Precise%20Match-on-Card%20technology.pdf on Jan. 7, 2007, 7 pgs.

(56) References Cited

OTHER PUBLICATIONS

Pash, "Automate proximity and location-based computer actions," Jun. 5, 2007, retrieved from http://lifehacker.com/265822/automate-proximity-and-location+based-computer-actions on or before Oct. 11, 2011, 3 pgs.

SplashID, "SplashID—Secure Password Manager for PDAs and Smartphones," Mar. 8, 2007, retrieved from http://www.splashdata.com/splashid/ via http://www.archive.org/ on or before Oct. 11, 2011, 2 pgs.

Srivastava, "Is Internet security a major issue with respect to the slow acceptance rate of digital signatures," Jan. 2, 2005, Computer Law & Security Report, pp. 392-404.

White, "How computers Work," Millennium Edition, 1999, Que Corporation, Indianapolis, IN, all pages.

\* cited by examiner

BIOMETRIC PERSONAL DATA KEY (PDK) AUTHENTICATION

CROSS-REFERENCE TO RELATED APPLICATIONS

The present application claims priority, under 35 U.S.C. § 120, to U.S. patent application Ser. No. 14/521,982, filed Oct. 23, 2014, entitled "Biometric Personal Data Key (PDK) Authentication, which claims priority to U.S. patent application Ser. No. 13/710,109 filed Dec. 10, 2012 and entitled "Biometric Personal Data Key (PDK) Authentication" which claims priority to U.S. patent application Ser. No. 11/314,199, filed Dec. 20, 2005 and entitled "Biometric Personal Data Key (PDK) Authentication," which claims the benefit of U.S. Provisional Application No. 60/637,538, filed on Dec. 20, 2004, and of U.S. Provisional Application No. 60/652,765, filed on Feb. 14, 2005, the entireties of which are hereby incorporated by reference.

Applicants hereby notify the USPTO that the claims of the present application are different from those of the aforementioned related applications. Therefore, Applicant rescinds any disclaimer of claim scope made in the parent application or any other predecessor application in relation to the present application. The Examiner is therefore advised that any such disclaimer and the cited reference that it was made to avoid may need to be revisited at this time. Furthermore, the Examiner is also reminded that any disclaimer made in the present application should not be read into or against the parent application, the grandparent application or any other related application.

FIELD OF THE INVENTION

The present invention relates generally to computerized authentication, and more specifically, to an authentication responsive to biometric verification of a user being authenticated.

BACKGROUND

Conventional user authentication techniques are designed to prevent access by unauthorized users. One technique is to require a user being authenticated to provide secret credentials, such as a password, before allowing access. Similarly, a PIN number can be required by an ATM machine before allowing a person to perform automated bank transactions. A difficulty with this technique is that it requires the user to memorize or otherwise keep track of the credentials. A uses often has multiple sets of credentials (e.g., passwords and PINs) and it can be quite difficult to keep track of them all.

Another technique that does not require the user to memorize credentials is to provide the user with an access object such as a key (e.g., an electronic key) that the user can present to obtain access. For example, a user can be provided with a small electronic key fob that allows access to a building or other secured location. A difficulty with using access objects is that authentication merely proves that the access object itself is valid; it does not verify that the legitimate user is using the access object. That is, illegitimate user can use a stolen access object to enter a secured location because the user's identity is never checked.

Some hybrid authentication techniques require the user to provide both an access object and credentials. The user is authenticated only upon providing both items. Of course, this solution does not resolve the problem of making the user memorize credentials.

Therefore, there is a need for systems and methods for verifying a user that is being authenticated that does not suffer from the limitations described above. Moreover, the solution should ease authentications by wirelessly providing an identification of the user.

SUMMARY

The present invention addresses the above needs by providing systems and methods for authentication responsive to biometric verification of a user being authenticated. In one embodiment, an integrated device includes a persistent storage to persistently stores a code such as a device identifier (ID) and biometric data for a user in a tamper-resistant format, and a verification module, in communication with the persistent storage, to receive scan data from a biometric scan for comparison against the biometric data, and if the scan data matches the biometric data, wirelessly sending a code for authentication.

In one embodiment, a method for verifying a user during authentication of an integrated device, includes persistently storing biometric data for the user in a tamper-resistant format; responsive to receiving a request for biometric verification of the user, receiving scan data from a biometric scan; comparing the scan data to the biometric data to determine whether the data match; and responsive to a determination that the scan data matches the biometric data, wirelessly sending a code for authentication.

Other embodiments include corresponding systems, apparatus, and computer programming products, configured to perform the actions of the methods, encoded on computer storage devices. These and other embodiments may each optionally include one or more of the following features. For instance the operations further include registering an age verification for the user in association with the code. For instance the operations further include establishing a secure communication channel prior to sending the code for authentication. For instance the operations further include receiving a request for the code without a request for biometric verification, and responsive to receiving the request for the code without a request for biometric verification, sending the code without requesting the scan data. For instance, the features include: the code is registered with a trusted authority, and the code can be authenticated to a third party by the trusted authority; the code uniquely identifies the integrated device; the code indicates that the biometric verification was successful; persistently storing biometric data includes permanently storing biometric data; the biometric data and the scan data are both based on a fingerprint scan by the user, an LED to be activated for requesting the biometric scan.

In one embodiment, a method for authenticating a verified user, includes receiving a code associated with a biometrically verified user; requesting authentication of the code; receiving an authentication result; and in response to the authentication result being positive, providing access to an application.

In one embodiment, a system includes an integrated device (e.g. a biometric key) to store biometric data for a user in a tamper resistant format, and if scan data can be verified as being from the user by comparing the scan data to the biometric data, wirelessly sending a code; and an authentication module to receive the code and send the code to a trusted authority for authentication, and responsive to the code being authenticated, allowing the user to access an application.

Other embodiments include corresponding systems, apparatus, and computer programming products, configured to perform the actions of the methods, encoded on computer storage devices. These and other embodiments may each optionally include one or more of the following features. For instance, the operations further include registering the code with a trusted authority, wherein requesting authentication of the code includes providing the code to the trusted authority and wherein receiving an authentication result comprises receiving the authentication result from the trusted authority. For instance the operations further include registering a date of birth or age with the trusted authority. For instance the operations further include establishing a secure communications channel with an integrated device, wherein the code associated with the biometrically verified user is received from the integrated device. For instance the features include: the integrated device receives an authentication request from the authentication module, and in response, requests a biometric scan from the user to generate the scan data; when the integrated device cannot verify the scan data as being from the user, it does not send the code.

Advantageously, user authentication is bolstered with highly reliable biometric verification of the user in an integrated device. Furthermore, a keyless environment relieves authorized users from having to memorize credentials, and of having to physically enter credentials or keys. In addition, the integrated device can be authenticated for an application that is open to the public (i.e., in an open loop system).

The features and advantages described in the specification are not all inclusive and, in particular, many additional features and advantages will be apparent to one of ordinary skill in the art in view of the drawings, specifications, and claims. Moreover, it should be noted that the language used in the specification has been principally selected for readability and instructional purposes and may not have been selected to delineate or circumscribe the inventive matter.

BRIEF DESCRIPTION OF THE DRAWINGS

The teachings of the present invention can be readily understood by considering the following detailed description in conjunction with the accompanying drawings.

DETAILED DESCRIPTION

Systems and methods for authentication responsive to biometric verification of a user being authenticated are described. Generally, biometric verification uses biometric data to ensure that the user of, for example, a biometric key, is the person registered as an owner. Biometric data is a digital or analog representation of characteristics unique to the user's body. For example, a fingerprint of a subject can be compared against previously-recorded biometric data for verification that the subject is the registered owner of the biometric key. Then, the biometric key itself can be authenticated.

Although the embodiments below are described using the example of biometric verification using a fingerprint, other embodiments within the spirit of the present invention can perform biometric verification using other types of biometric data. For example, the biometric data can include a palm print, a retinal scan, an iris scan, hand geometry recognition, facial recognition, signature recognition, or voice recognition.

Figure 1:
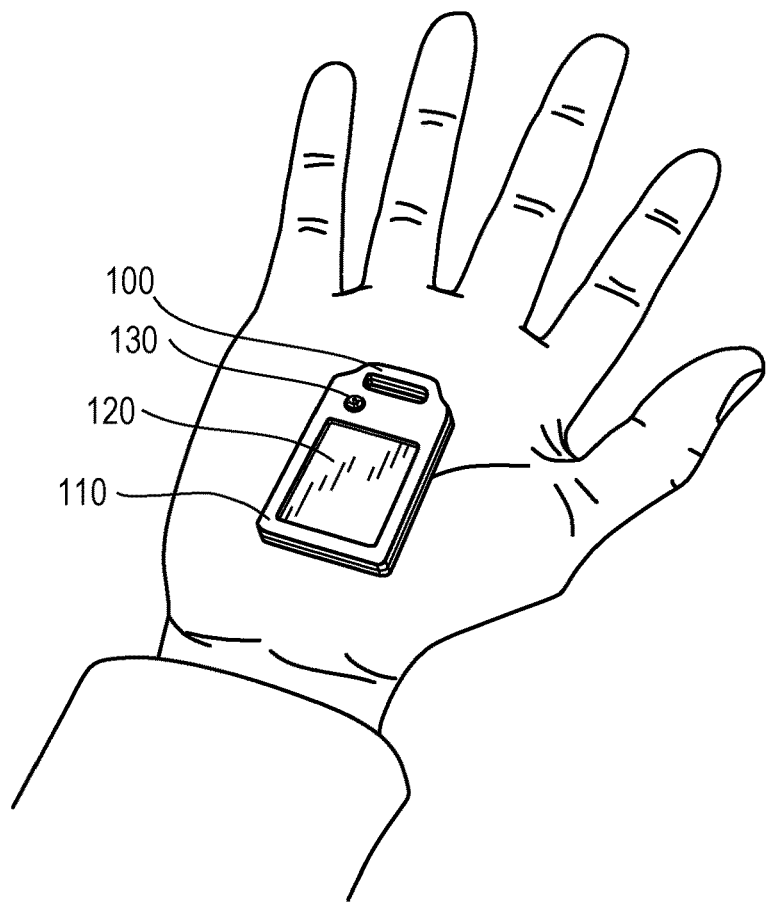
FIG. 1 is a schematic diagram illustrating a biometric key for providing authentication information for a biometrically verified user according to one embodiment of the present invention.

FIG. 1 is a schematic diagram illustrating an example of a biometric key 100 for providing authentication information for a biometrically verified user according to one embodiment of the present invention. In one embodiment, the biometric key 100 comprises a frame 110, a scan pad 120, and an LED 130. In one embodiment, biometric key 100 has a small form factor (e.g., the size of an automobile remote control) such that it can be unobtrusively carried by a user. In one embodiment, the biometric key 100 is integrated into another object or device. A device having an integrated biometric key 100 is occasionally referred to herein as an "integrated device." For example, in one embodiment, the biometric key 100 is integrated into a mobile phone (e.g. a cellular phone or smartphone), tablet, laptop, mp3 player, mobile gaming device, watch, key fob or other mobile device, thereby making the biometric key 100 unobtrusive to carry.

Frame 110 can be formed by plastic, metal or another suitable material. Frame 110 is shaped to secure scan pad 120, and includes a perforation for attachment to, for example a key chain or clip. In one embodiment, frame 110 is formed from a unitary molding to protect biometric data. Accordingly, frame 110 cannot be opened to expose the underlying components unless it is broken.

Scan pad 120 can be, for example, an optical scanner using a charge coupled device, or a capacitive scanner. Scan pad 120 can be sized to fit a thumb or other finger. Biometric key 100 of the present embodiment includes LED 130 that lights up to request a fingerprint scan from a user. In one embodiment, LED 130 can also confirm that user verification and/or authentication has completed.

Biometric key 100 can authenticate a user for various purposes. For example, biometric key 100 can allow keyless entry into homes and autos. In another example, biometric key 100 can log a user onto a computer system or point of sale register without typing in credentials. In still another example, biometric key 100 can verify that an enrolled user is above a certain age (e.g., before allowing access to a slot machine in a casino). In some embodiments, biometric key 100 operates without biometric verification, and request a fingerprint scan from a user only when biometric verification is needed for the particular use.

Figure 2:
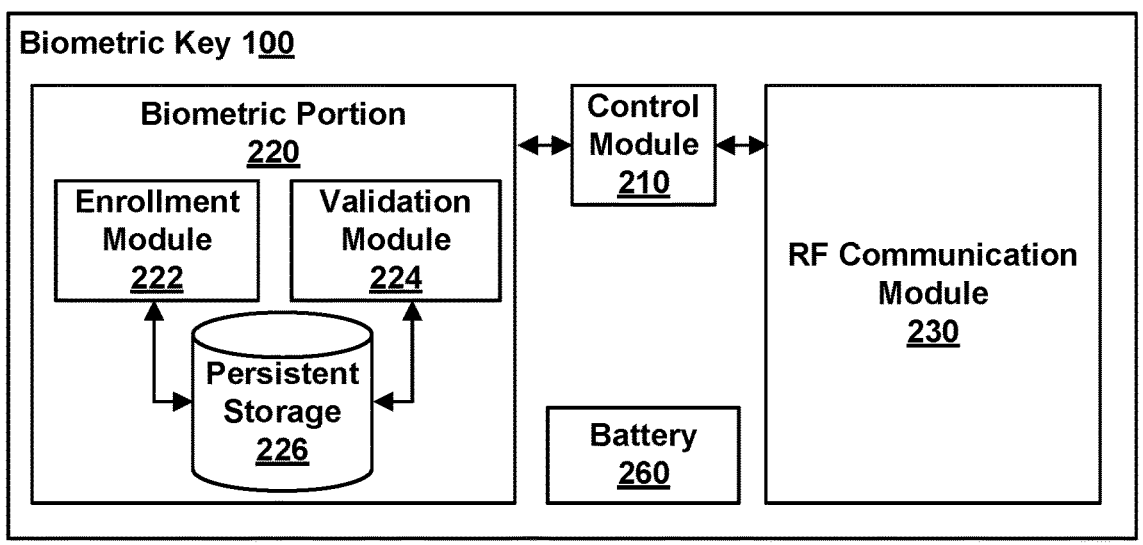
FIG. 2 is a block diagram illustrating functional modules within the biometric key according to one embodiment of the present invention.

FIG. 2 is a block diagram illustrating biometric key 100 according to one embodiment of the present invention. Biometric key 100 comprises control module 210, biometric portion 220, RF communication module 230, persistent storage 240, and battery 250. Biometric key 100 can be formed from a combination of hardware and software components as described above. In one embodiment, biometric key 100 comprises a modified key fob.

Control module 210 coordinates between several functions of biometric key 100. In one embodiment, control module 210 provides a verification code upon successful verification of the user. More specifically, once biometric portion 220 indicates that a fingerprint scan matches biometric data that was collected during enrollment, control module 210 can trigger RF communication module 230 for sending a code indicating that the user was verified. In another embodiment, control module 210 can work in the opposite direction by detecting a request for verification from RF communication module 230, and then requesting verification of the user from biometric portion 210. Note that control module 210 of FIG. 2 is merely a grouping of control functions in a central architecture, and in other embodiments, the control functions can be distributed between several modules around biometric key 100.

Biometric portion 220 comprises enrollment module 222, validation module 224, and biometric data base 226. In one embodiment, enrollment module 222 registers a user with biometric key 100 by persistently storing biometric data associated with the user. Further, enrollment module 222 registers biometric key 100 with a trusted authority by providing the code (e.g., device ID) to the trusted authority. Or conversely, the trusted authority can provide the code to biometric key 100 to be stored therein.

Validation module 224 can comprise scan pad 120 (FIG. 1) to capture scan data from a user's fingerprint (e.g., a digital or analog representation of the fingerprint). Using the scan data, validation module 214 determines whether the user's fingerprint matches the stored biometric data from enrollment. Conventional techniques for comparing fingerprints can be used. For example, the unique pattern of ridges and valleys of the fingerprints can be compared. A statistical model can be used to determine comparison results. Validation module 224 can send comparison results to control module 210.

In other embodiments, validation module 224 can be configured to capture biometric data for other human characteristics. For example, a digital image of a retina, iris, and/or handwriting sample can be captured. In another example, a microphone can capture a voice sample.

Persistent storage 226 persistently stores biometric data from one or more users which can be provided according to specific implementations. In one embodiment, at least some of persistent storage 226 is a memory element that can be written to once but cannot subsequently be altered. Persistent storage 226 can include, for example, a ROM element, a flash memory element, or any other type of non-volatile storage element. Persistent storage 226 is itself, and stores data in, a tamper-proof format to prevent any changes to the stored data. Tamper-proofing increases reliability of authentication because it does not allow any changes to biometric data (i.e., allows reads of stored data, but not writes to store new data or modify existing data). Furthermore, data can be stored in an encrypted form.

In one embodiment, persistent storage 226 also stores the code that is provided by the key 100 responsive to successful verification of the user. As described above, in one embodiment the code is a device ID or other value that uniquely identifies biometric key 100. In one embodiment, the code is providing during the manufacturing process and the biometric data are provided during an enrollment of the user. In other embodiments, the code is provided during enrollment and/or the biometric data are provided during manufacturing. Further, in some embodiments persistent storage 226 stores other data utilized during the operation of biometric key 100. For example, persistent storage 226 can store encryption/decryption keys utilized to establish secure communications links.

Radio frequency (RF) communication module 230 is, for example, a transceiver or other mechanism for wireless communication. RF communication module 230 can send and receive data (e.g., the code) as modulated electromagnetic signals. In one embodiment, RF communication 220 can be optimized for low-power usage by, for example, using short-range transceivers. RF communication module 230 can actively send out connection requests, or passively detect connection requests.

Battery 260 can be a conventional power source suitable for the components of biometric key 100. Battery 260 can be either replaceable or rechargeable. Alternatively, battery 260 can be embedded within key 100 such that the key must be discarded or recycled upon expiration of the battery.

Figure 3:
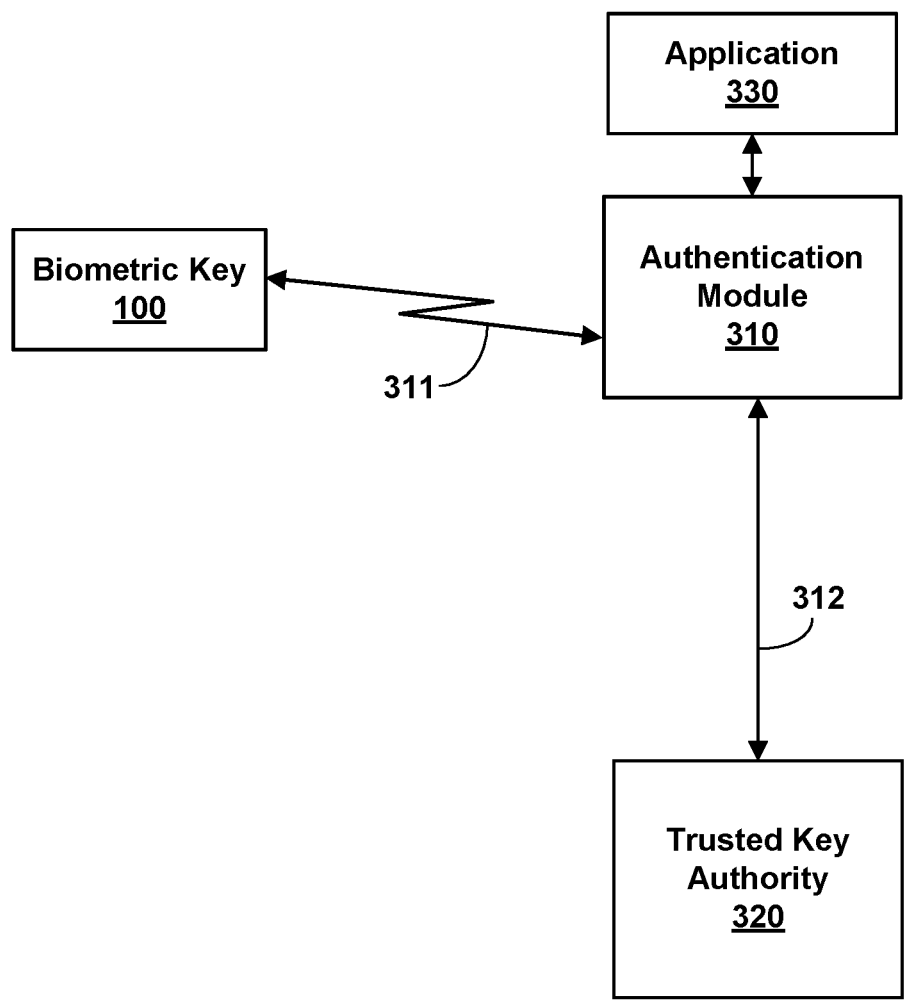
FIG. 3 is a block diagram illustrating a system for providing authentication information for a biometrically verified user.

FIG. 3 is a block diagram illustrating a system 300 for providing authentication information for a biometrically verified user. System 300 comprises an authentication module 310 in communication with biometric key 100, a trusted key authority 320, and an application 330.

Authentication module 310 is coupled in communication with biometric key via line 311 (i.e., a wireless medium such as EM signals), and with trusted key authority 320 via line 312 (e.g., a secure data network such as the Internet, or a cell network). Authentication module 310 can include one or more of, for example, a computerized device, software executing on a computerized device, and/or a reader/decoder circuit. In one embodiment, authentication module 310 servers as a gatekeeper to application 330 by requiring the code indicating successful biometric verification of the user prior to allowing access to the application. Further, in one embodiment, authentication module 310 provides the code to trusted key authority 320 in order to verify that it belongs to a legitimate key (e.g., when application 330 is security-critical). Authentication module 310 can send a message to application 330, or otherwise allow access to the application, responsive to a successful authentication by trusted key authority 320.

Application 330 is a resource that can be accessed by a verified and authenticated user. Application 330 can be, for example, a casino machine, a keyless lock, a garage door opener, an ATM machine, a hard drive, computer software, a web site, a file, a financial account (e.g. a savings account, checking account, brokerage account, credit card account, credit line, etc.) and the like. In one embodiment, a file includes medical information such as a medical record, insurance information or other healthcare information. Application 330 can execute on the same system as authentication module 310 or on another system in communication with the system of the authentication module. In one embodiment, application module 330 allows access by a user after receiving a message from authentication module 310. At that point, application 330 can allow direct use by the user, or require that communications continue to pass through authentication module 310 for continued authentication.

Trusted key authority 320 is a third-party authority that is present in some embodiments in order to provide enhanced security. In one embodiment, trusted key authority 320 verifies that a code from a biometric key is legitimate. To do so, the trusted key authority 320 stores a list of codes for legitimate biometric keys. The list can be batched or updated each time a new user/key is enrolled. In one embodiment, trusted key authority 320 can also store a profile associated with a biometric key. The profile describes the user associated with the key, the key itself, the trusted key authority, and/or other relevant information. In one embodiment, the functionality of trusted key authority 320 is provided by a server or other computerized device.

In an open system, where unknown users can attempt authentication (e.g., in a public grocery store), trusted key authority 320 provides verification that a key presenting a certain code is legitimate. By contrast, in a closed system, only known users are legitimate (e.g., owners of a home), the trusted key authority 320 can be maintained locally and serves to verify that the key belongs to one of the limited number of users that can use the system.

Figure 4:
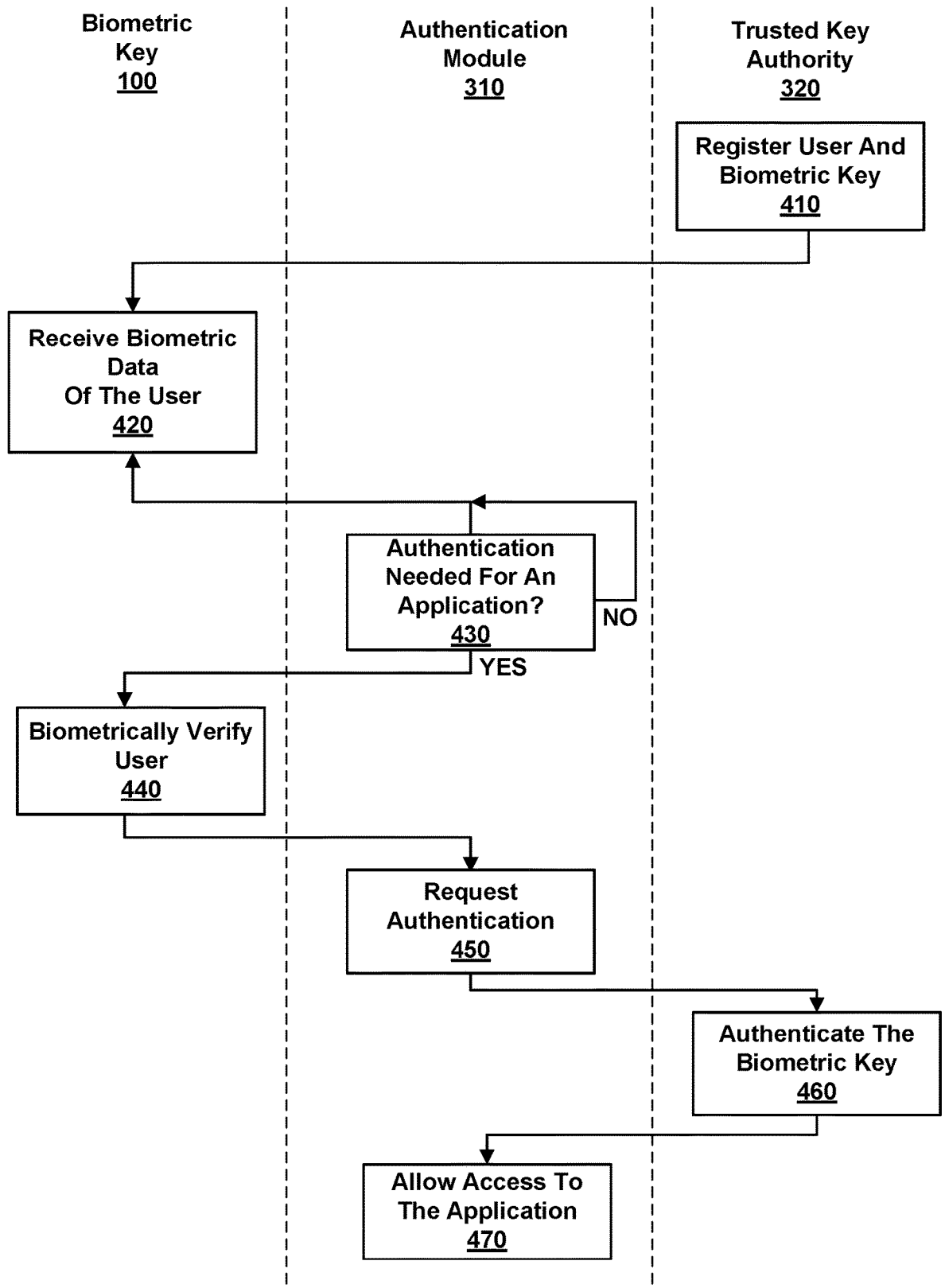
FIG. 4 is a flow chart illustrating a method for providing authentication information for a biometrically verified user.

FIG. 4 is a flow chart illustrating a method 400 for authenticating a biometrically verified user using a trusted key authority (e.g., authority 320). A biometric key (e.g., biometric key 100) is registered 410 with the trusted key authority. The code (e.g., device ID) of the key is stored by the trusted key authority. Additionally, a user is enrolled 420 with the biometric key as described below with reference to FIG. 5.

In various situations, authentication of the key is needed 430 (e.g., by authentication module 310). In one embodiment, authentication can be required prior to allowing access to an application (e.g., application 330). For example, a user can be standing proximate to a slot machine in a casino which requires that a user be over the age of 21. The slot machine can detect the biometric key in the user's pocket, and, in response, spawn a conspicuous pop-up window on the slot machine requesting age verification. Alternatively, the biometric key can blink an LED. In other embodiments, biometric verification is not necessary and only the key itself is authenticated.

The biometric key establishes communication with the authentication module using various techniques. In one embodiment, the key and authentication module engage in preliminary data exchanges to determine who and/or what they are (e.g., to ascertain that they belong to the same system). These data exchanges can include challenge-response dialogs, hashing algorithms, and the like in order to ensure that the biometric key and authentication module are themselves legitimate. Further, in one embodiment the key and authentication module establish a secure communications channel. The key performs the biometric verification of the user 440 as described below with reference to FIG. 6. If the biometric verification of the user is successful, the key provides its code over the secure communications channel.

The code is utilized to authenticate the biometric key itself 450, 460 as described below with reference to FIG. 7 and profile information is received. Responsive to successful authentication of the key, access is allowed 470 to the application. In the slot machine example, a new pop-up window can be spawned to indicate a successful age verification.

Figure 5:
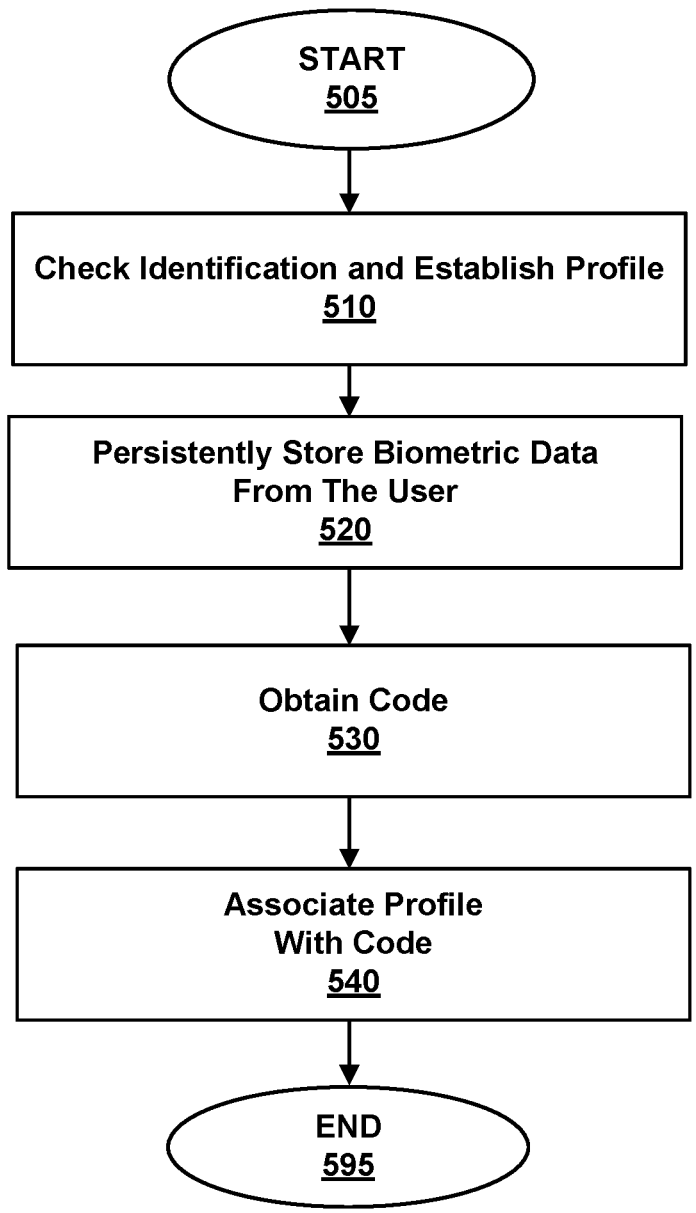
FIG. 5 is a flow chart illustrating a method for enrolling biometric data of the user with the biometric key.

FIG. 5 is a flow chart illustrating a method 500 for enrolling biometric data of the user with the biometric key according to one embodiment of the present invention. An agent checks 510 an identification of the user and establishes a profile. The agent can be, for example, a government official, a notary, and/or an employee of a third party which operates the trusted key authority, or another form of witness. The agent can follow standardized procedures such as requiring identification based on a state issued driver license, or a federally issued passport in order to establish a true identity of the user.

The profile describes the user and can include, for example, the user's name, date of birth, age, passwords, account numbers, preferences etc. In some embodiments, the profile stores no or only limited information about the user. For example, the agent might store the date of birth of the user in the profile, but not store any other information about the user. In addition, the profile describes the biometric key and/or key authority. For the biometric key, the profile can store a value indicating the status of the key, such as whether the key is in-service, out-of-service, abandoned, lost, stolen etc. For the key authority, the profile can store a value identifying the key authority.

The agent also collects and persistently stores 520 biometric data from the user. To do so, a fingerprint or eye retina can be scanned and converted to data which is then persistently stored in the biometric key. In one embodiment, the agent does not retain the biometric data. Since this step occurs under control of the agent, the agent can be certain that the biometric data stored within the key matches the user who presented the identification. The agent also obtains the code (e.g., device ID) from the biometric key in which the biometric data was stored. The agent associates the code and the profile using a table and/or other data structure.

Figure 6:
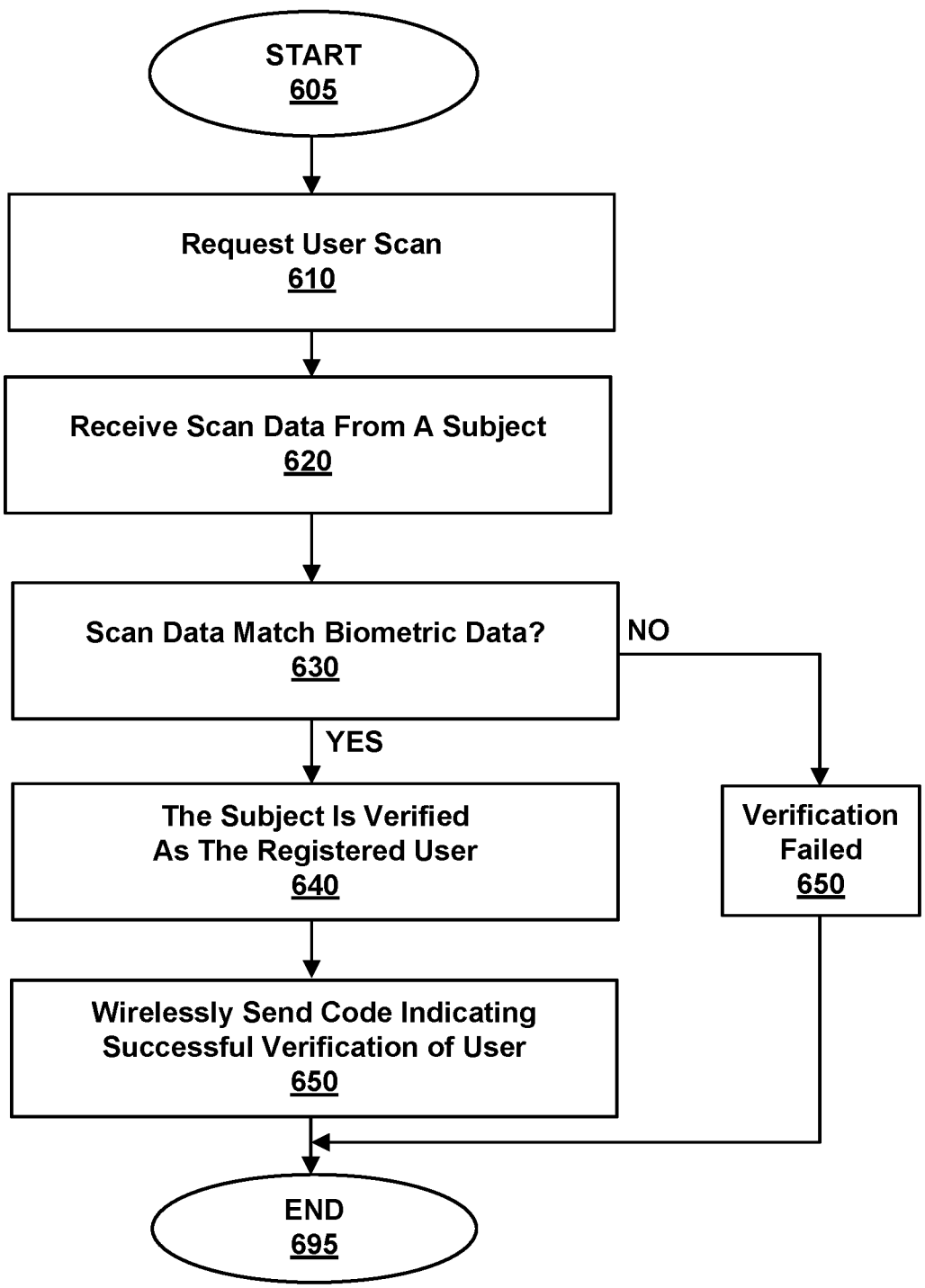
FIG. 6 is a flow chart illustrating a method for verifying a subject presenting the biometric key according to one embodiment of the present invention.

FIG. 6 is a flow chart illustrating a method 600 for verifying a subject presenting the biometric key according to one embodiment of the present invention. In response to an authentication request, a user scan is requested 610 (e.g., by a blinking LED). Once the subject provides a fingerprint, scan data is received 620. Scan data is compared for a match 630 to previously-stored biometric data. If there is no match, then verification fails 650.

If there is a match, the subject is verified 640 as the user. The code indicating a successful verification is wirelessly sent 650 from the biometric key (e.g., by RF communication module 230).

Figure 7:
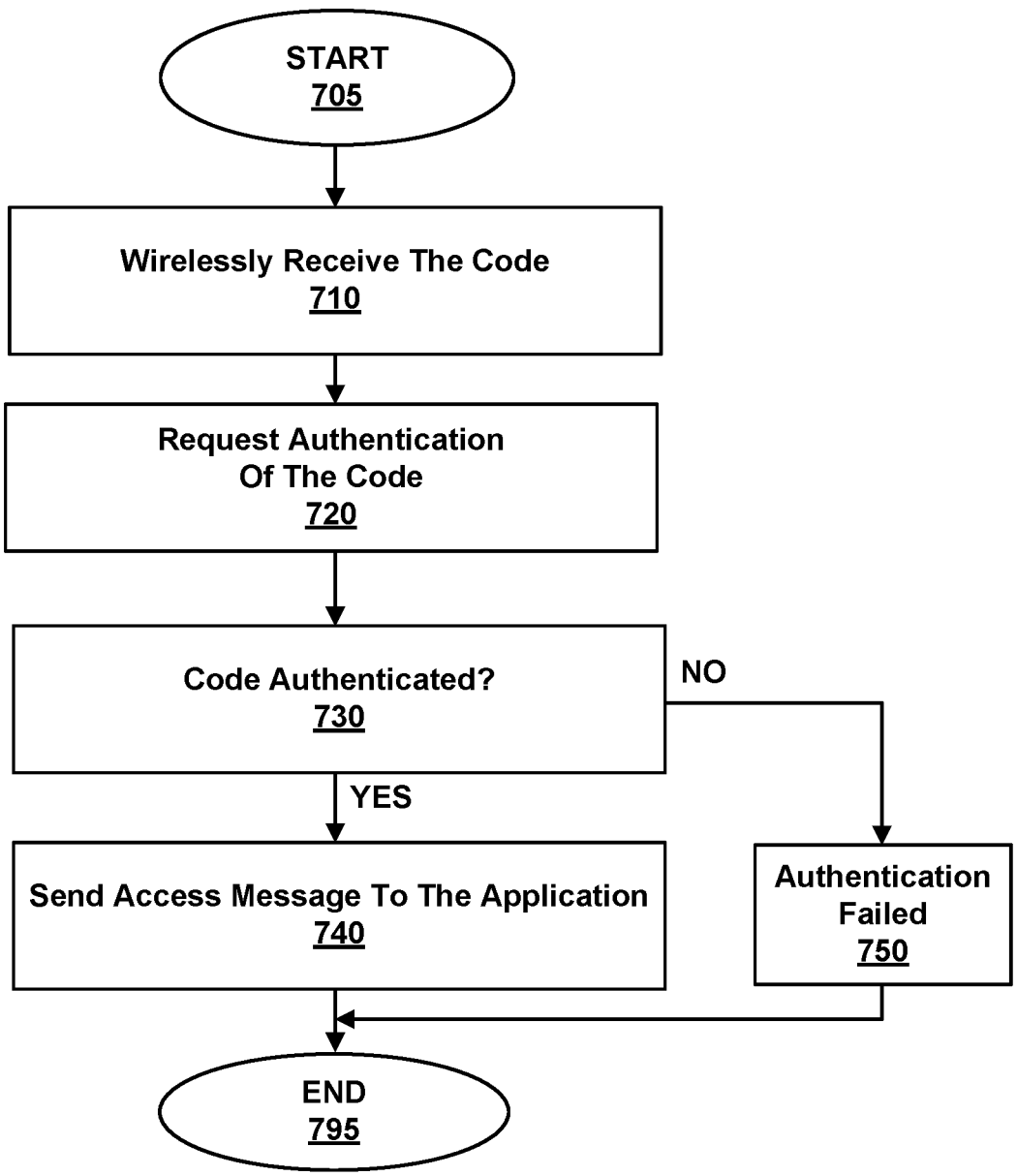
FIG. 7 is a flow chart illustrating a method for authenticating a verified user of the biometric key according to one embodiment of the present invention.

FIG. 7 is a flow chart illustrating a method 700 for authenticating a biometric key according to one embodiment of the present invention. The code is wirelessly received 710. A request for authentication of the code is sent to the trusted key authority 720. The trusted key authority determines whether the code is authentic 730 (i.e., it was created through an established enrollment process) and has a valid status (e.g., has not expired). If authentication is successful, the trusted key authority sends an access message to the application to allow user access and/or provide additional information from the profile 740 (such as the user's age). If authentication is not successful, authentication fails 750 and the message to the application indicates that the user should be denied access.

In some embodiments, the biometric key provides multiple codes and/or other data values. For example, the key can provide a device ID code that the authentication module can provide to the trusted key authority in order to authenticate the key, and the key can provide a secret decryption value that can be used to communicate with the biometric key. As used herein, the term "code" is intended to include one or more of these values, depending upon the specific embodiment.

The order in which the steps of the methods of the present invention are performed is purely illustrative in nature. The steps can be performed in any order or in parallel, unless otherwise indicated by the present disclosure. The methods of the present invention may be performed in hardware, firmware, software, or any combination thereof operating on a single computer or multiple computers of any type. Software embodying the present invention may comprise computer instructions in any form (e.g., source code, object code, interpreted code, etc.) stored in any computer-readable storage medium (e.g., a ROM, a RAM, a magnetic media, a compact disc, a DVD, etc.). Such software may also be in the form of an electrical data signal embodied in a carrier wave propagating on a conductive medium or in the form of light pulses that propagate through an optical fiber.

While particular embodiments of the present invention have been shown and described, it will be apparent to those skilled in the art that changes and modifications may be made without departing from this invention in its broader aspect and, therefore, the appended claims are to encompass within their scope all such changes and modifications, as fall within the true spirit of this invention.

In the above description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus can be specially constructed for the required purposes, or it can comprise a general-purpose computer selectively activated or reconfigured by a computer program stored in the computer. Such a computer program can be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and modules presented herein are not inherently related to any particular computer or other apparatus. Various general-purpose systems can be used with programs in accordance with the teachings herein, or it may prove convenient to construct more specialized apparatuses to perform the method steps. The required structure for a variety of these systems will appear from the description below. In addition, the present invention is not described with reference to any particular programming language. It will be appreciated that a variety of programming languages can be used to implement the teachings of the invention as described herein. Furthermore, as will be apparent to one of ordinary skill in the relevant art, the modules, features, attributes, methodologies, and other aspects of the invention can be implemented as software, hardware, firmware or any combination of the three. Of course, wherever a component of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present invention is in no way limited to implementation in any specific operating system or environment.

It will be understood by those skilled in the relevant art that the above-described implementations are merely exemplary, and many changes can be made without departing from the true spirit and scope of the present invention. Therefore, it is intended by the appended claims to cover all such changes and modifications that come within the true spirit and scope of this invention.

What is claimed is:

1. A method comprising:
   receiving, at a smartphone, an identification (ID) code from a third-party trusted authority, the ID code uniquely identifying the smartphone among a plurality of smartphones;
   persistently storing biometric data and the ID code on the smartphone, wherein the biometric data is one selected from a group consisting of facial recognition, a fingerprint scan, and a retinal scan of a legitimate user;
   receiving, at the smartphone, scan data from a biometric scan using the smartphone;
   comparing, using the smartphone, the scan data to the biometric data;
   determining whether the scan data matches the biometric data; and
   responsive to a determination that the scan data matches the biometric data, wirelessly sending, from the smartphone, the ID code for comparison by the third-party trusted authority against one or more previously registered ID codes maintained by the third-party trusted authority, a transaction being completed responsive to the third-party trusted authority successfully authenticating the ID code, wherein the transaction being completed includes accessing one or more from a group consisting of a casino machine, a keyless lock, an ATM machine, a web site, a file and a financial account.

2. The method of claim 1, further comprising:
   Receiving a request for biometric verification, and responsive to a determination that the scan data does not match the biometric data, indicating the smartphone cannot verify the scan data as being from the legitimate user, the smartphone does not send the ID code.

3. The method of claim 1, wherein completing the transaction includes accessing an application.

4. The method of claim 1, wherein the transaction being completed responsive to the third-party trusted authority successfully authenticating the ID code includes the third-party trusted authority sending an indication that the third-party trusted authority authenticated the ID code to another party.

5. A smartphone comprising:
a persistent storage having an input that receives an identification (ID) code from a third-party trusted authority, and biometric data, wherein the biometric data is one selected from a group consisting of facial recognition, a fingerprint scan, and a retinal scan, of a legitimate user, the ID code uniquely identifying the smartphone among a plurality of smartphones, the persistent storage storing the biometric data and the ID code, the persistent storage having an output configured to provide a first set of biometric data and the ID code for use on the smartphone;
a validation module, coupled to communicate with the persistent storage to receive the biometric data from the persistent storage, the validation module having a scan pad to capture scan data from a biometric scan, the validation module comparing the scan data to the biometric data to determine whether the scan data matches the biometric data; and
a wireless transceiver that, responsive to a determination that the scan data matches the biometric data, sends the ID code for comparison by the third-party trusted authority against one or more previously registered ID codes maintained by the third-party trusted authority, a transaction being completed responsive to the third-party trusted authority successfully authenticating the ID code, wherein the transaction being completed includes accessing one or more from a group consisting of a casino machine, a keyless lock, an ATM machine, a web site, a file and a financial account.

6. The smartphone of claim 5, wherein the ID code is transmitted to the third-party trusted authority over a network.

7. A system, comprising:
a smartphone that persistently stores biometric data and an ID code, wherein the biometric data is one selected from a group consisting of facial recognition, a fingerprint scan, and a retinal scan data of a legitimate user, and the ID code is received from a third-party trusted authority, the ID code uniquely identifying the smartphone among a plurality of smartphones, the smartphone configured to indicate that a biometric authentication is requested, the smartphone configured to wirelessly send the ID code to the third-party trusted authority for authentication responsive to determining that scan data from a biometric scan performed using the smartphone matches the biometric data of the legitimate user, wherein a transaction is completed responsive to successful authentication of the ID code by the third-party trusted authority, wherein the transaction being completed includes accessing one or more from a group consisting of a casino machine, a keyless lock, an ATM machine, a web site, a file and a financial account; and
the third-party trusted authority operated by a third party, the third-party trusted authority storing a plurality of legitimate ID codes and authenticating the ID code received based on a comparison of the ID code received and the legitimate ID codes included in the plurality of the legitimate ID codes.

8. The system of claim 7, wherein the smartphone receives an authentication request, and in response, requests biometric scan from a user to generate the scan data and, when the smartphone cannot verify the scan data as being from the legitimate user, the smartphone does not send the ID code.

9. The system of claim 7, wherein completing the transaction includes accessing an application.

* * * * *

(12) EX PARTE REEXAMINATION CERTIFICATE (12870th)
United States Patent
Giobbi

(10) Number: US 10,698,989 C1
(45) Certificate Issued: Mar. 20, 2025

(54) BIOMETRIC PERSONAL DATA KEY (PDK) AUTHENTICATION

(71) Applicant: Proxense, LLC, Bend, OR (US)

(72) Inventor: John J. Giobbi, Bend, OR (US)

(73) Assignee: PROXENSE, LLC

Reexamination Request:
No. 90/015,054, Jun. 8, 2022

Reexamination Certificate for:
Patent No.: 10,698,989
Issued: Jun. 30, 2020
Appl. No.: 15/049,060
Filed: Feb. 20, 2016

Related U.S. Application Data

(63) Continuation of application No. 14/521,982, filed on Oct. 23, 2014, now Pat. No. 9,298,905, which is a continuation of application No. 13/710,109, filed on Dec. 10, 2012, now Pat. No. 8,886,954, which is a continuation of application No. 11/314,199, filed on Dec. 20, 2005, now Pat. No. 8,352,730.

(60) Provisional application No. 60/652,765, filed on Feb. 14, 2005, provisional application No. 60/637,538, filed on Dec. 20, 2004.

(51) Int. Cl.
*G06F 21/00* (2013.01)
*G05B 1/00* (2006.01)
*G06F 21/32* (2013.01)
*G06F 21/35* (2013.01)
*G07C 9/25* (2020.01)
*H04L 9/32* (2006.01)

(52) U.S. Cl.
CPC .............. *G06F 21/32* (2013.01); *G05B 1/00* (2013.01); *G06F 21/35* (2013.01); *G07C 9/257* (2020.01); *H04L 9/321* (2013.01)

(58) Field of Classification Search
None
See application file for complete search history.

(56) References Cited

To view the complete listing of prior art documents cited during the proceeding for Reexamination Control Number 90/015,054, please refer to the USPTO's Patent Electronic System.

*Primary Examiner* — My Trang Ton

(57) ABSTRACT

Systems and methods verifying a user during authentication of an integrated device. In one embodiment, the system includes an integrated device and an authentication unit. The integrated device stores biometric data of a user and a plurality of codes and other data values comprising a device ID code uniquely identifying the integrated device and a secret decryption value in a tamper proof format, and when scan data is verified by comparing the scan data to the biometric data, wirelessly sends one or more codes and other data values including the device ID code. The authentication unit receives and sends the one or more codes and the other data values to an agent for authentication, and receives an access message from the agent indicating that the agent successfully authenticated the one or more codes and other data values and allows the user to access an application.

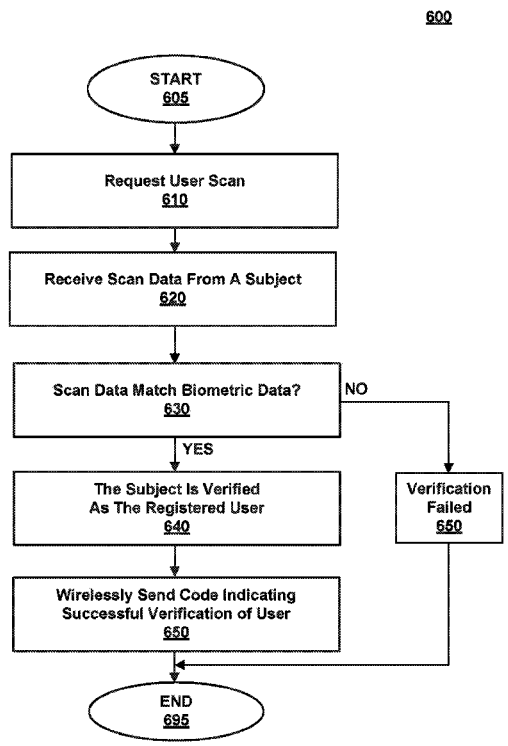

EX PARTE REEXAMINATION CERTIFICATE

THE PATENT IS HEREBY AMENDED AS INDICATED BELOW.

AS A RESULT OF REEXAMINATION, IT HAS BEEN DETERMINED THAT:

Claims 1-9 are cancelled.

\* \* \* \* \*